(12) United States Patent
Stephens et al.

(10) Patent No.: US 12,193,447 B2
(45) Date of Patent: Jan. 14, 2025

(54) SYSTEMS FOR AUTOMATED FISH PROCESSING

(71) Applicant: Shinkei Systems Corp., Hackensack, NJ (US)

(72) Inventors: Joseph Stephens, Hackensack, NJ (US); Saif Najam Khawaja, Hackensack, NJ (US); Zhifei Shen, Hackensack, NJ (US)

(73) Assignee: Shinkei Systems Corp., Hackensack, NJ (US)

( * ) Notice: Subject to any disclaimer, the term of this patent is extended or adjusted under 35 U.S.C. 154(b) by 0 days.

(21) Appl. No.: 18/601,788

(22) Filed: Mar. 11, 2024

(65) Prior Publication Data

US 2024/0298656 A1   Sep. 12, 2024

Related U.S. Application Data

(60) Provisional application No. 63/451,508, filed on Mar. 10, 2023.

(51) Int. Cl.
*A22B 3/00* (2006.01)
*A22B 3/08* (2006.01)
*A22B 3/10* (2006.01)
*A22B 7/00* (2006.01)

(52) U.S. Cl.
CPC .............. *A22B 3/08* (2013.01); *A22B 3/10* (2013.01); *A22B 7/00* (2013.01)

(58) Field of Classification Search
CPC .............. A22B 7/00; A22B 3/08; A22B 3/10
USPC ........................................... 452/54
See application file for complete search history.

(56) References Cited

U.S. PATENT DOCUMENTS

| 4,557,019 A | 12/1985 | Van et al. |
| 4,748,724 A | 6/1988 | Lapeyre et al. |
| 6,014,936 A | 1/2000 | Rogers et al. |
| 6,563,904 B2* | 5/2003 | Wijts ............. A22C 17/0086 83/72 |
| 6,808,448 B1* | 10/2004 | Kanaya ............. A22C 29/021 452/1 |
| 7,452,266 B2 | 11/2008 | Bottemiller |
| 7,623,249 B2 | 11/2009 | Sandberg et al. |

(Continued)

FOREIGN PATENT DOCUMENTS

| CA | 2531981 A1 | 7/2006 |
| EP | 3490383 B1 | 5/2021 |

(Continued)

OTHER PUBLICATIONS

"2021 Pennovation Accelerator Names Two Winners: REGO and Shinkei Systems", Pennovation Works, 2021, downloaded Jan. 4, 2023, https://pennovation.upenn.edu/news/2021-pennovation-accelerator-names-two-winners-rego-and-shinkei-systems.

(Continued)

*Primary Examiner* — Richard T Price, Jr.
(74) *Attorney, Agent, or Firm* — Jeffrey Schox; Diana Lin

(57) ABSTRACT

A system for fish processing can include: a fish fixturing subsystem, a tooling subsystem, an analysis subsystem, and/or any other suitable components, which can optionally be part of a fish processing subsystem. Additionally or alternatively, the system can optionally include: an intake subsystem, an expulsion subsystem, and/or any other suitable components.

20 Claims, 17 Drawing Sheets

(56) References Cited

U.S. PATENT DOCUMENTS

| | | | |
|---|---|---|---|
| 8,092,283 B2 | 1/2012 | Hansen | |
| 9,095,147 B2 | 8/2015 | Hjalmarsson et al. | |
| 10,531,668 B2 | 1/2020 | Steffens et al. | |
| 11,498,235 B2 | 11/2022 | Blaine et al. | |
| 2004/0072525 A1 | 4/2004 | Pein | |
| 2007/0292559 A1* | 12/2007 | Garwood | B65D 81/267 452/155 |
| 2011/0207388 A1 | 8/2011 | Hansen | |
| 2019/0037865 A1 | 2/2019 | Pettersen et al. | |
| 2020/0288731 A1 | 9/2020 | Hjalmarsson et al. | |
| 2021/0142052 A1 | 5/2021 | James et al. | |
| 2023/0157263 A1 | 5/2023 | Brenner et al. | |

FOREIGN PATENT DOCUMENTS

| | | |
|---|---|---|
| JP | 2000228941 A | 8/2000 |
| WO | 9844805 A1 | 10/1998 |
| WO | 0132025 A1 | 5/2001 |
| WO | 2022083848 A1 | 4/2022 |

OTHER PUBLICATIONS

"Shinkei Systems Fish processing robotics to quadruple fisher and farmer revenues", downloaded Jan. 4, 2023, https://www.ycombinator.com/companies/shinkei-systems.

"Stun & Bleed System, Fish processing in the most efficient and humane way possible", Optimar, https://optimar.no/stun-bleed-system, first downloaded Jan. 24, 2024.

Bjarnason, Jón Bjarni, "Computer vision system to detect salmon deformity", Final Report in Electrical Engineering B.Sc., 2016, School of Science and Engineering, Reykjavik University.

Coldewey, Devin , et al., "Shinkei Systems' AI-guided fish harvesting is more humane and less wasteful", TechCrunch, Jul. 28, 2022, https://techcrunch.com/2022/07/28/shinkei-systems-ai-guided-fish-harvesting-is-more-humane-and-less-wasteful/?guccounter=1.

Khawaja, Saif Najam, et al., "Systems and Methods for Automated Fish Processing", U.S. Appl. No. 18/582,481, filed Feb. 20, 2024.

Khawaja, Saif Najam, et al., "Systems and Methods of Fish Processing Device", U.S. Appl. No. 17/984,084, filed Nov. 9, 2023.

* cited by examiner

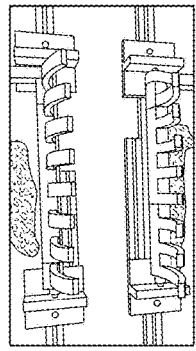
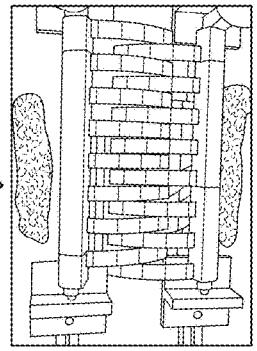
FIGURE 8A    FIGURE 8B
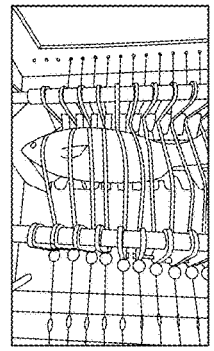
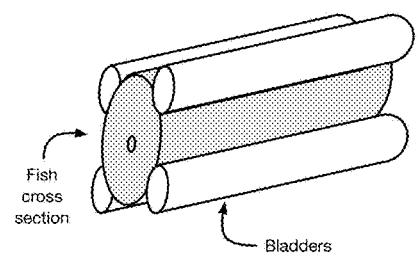
FIGURE 8D
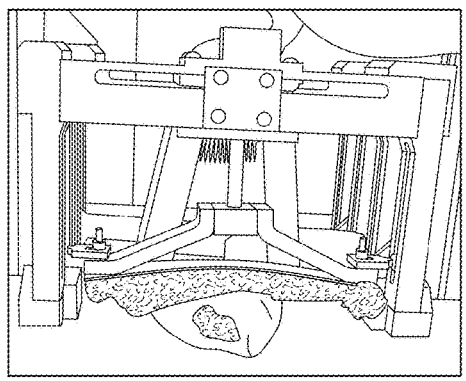
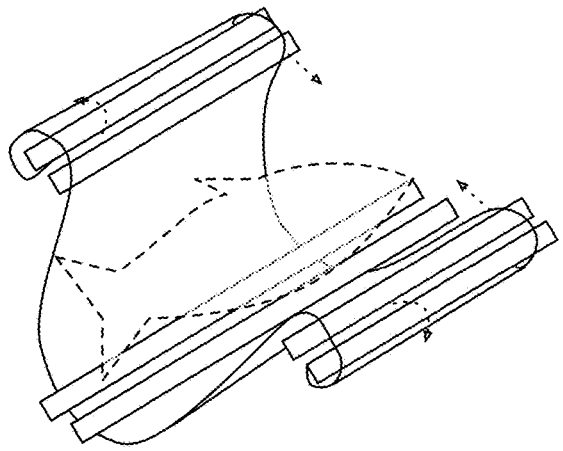
FIGURE 8C    FIGURE 8E

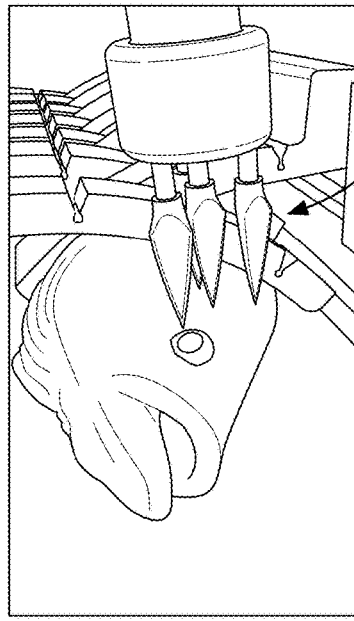
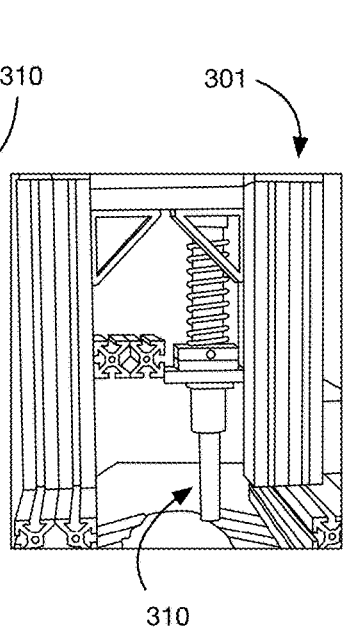
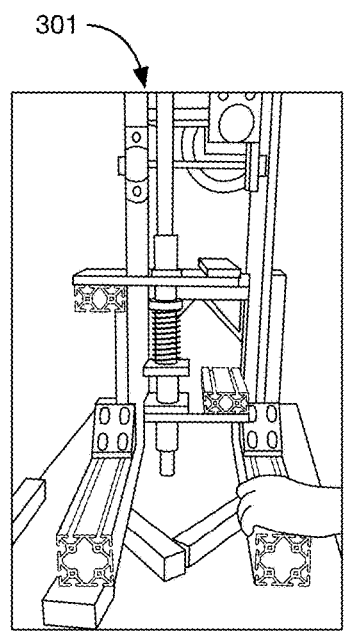
FIGURE 13A
FIGURE 13B
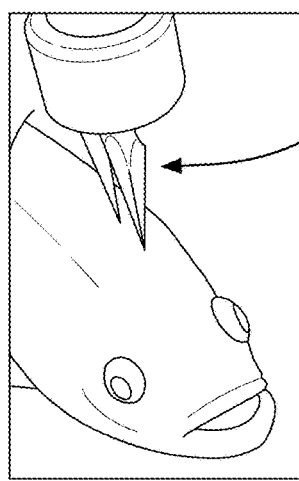
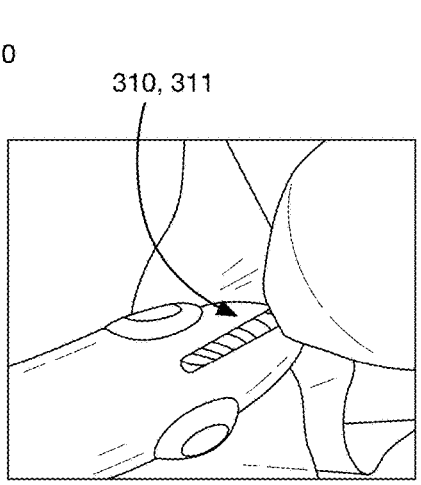
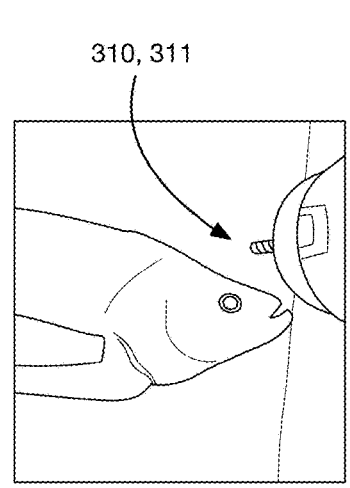
FIGURE 13C
FIGURE 13D
FIGURE 13E

SYSTEMS FOR AUTOMATED FISH PROCESSING

CROSS-REFERENCE TO RELATED APPLICATIONS

This application claims the benefit of U.S. Provisional Application No. 63/451,508, filed 10 Mar. 2023, which is incorporated in its entirety by this reference.

TECHNICAL FIELD

This invention relates generally to the food processing field, and more specifically to a new and useful system for automated fish processing in the food processing field.

BRIEF DESCRIPTION OF THE FIGURES

FIGS. 8A-8E are illustrative representations of variants of a live fish fixturing mechanism.

FIGS. 13A-13E are illustrative representations of variants for performing euthanasia.

DETAILED DESCRIPTION

The following description of the embodiments of the invention is not intended to limit the invention to these embodiments, but rather to enable any person skilled in the art to make and use this invention.

1. Overview

Figure 1:
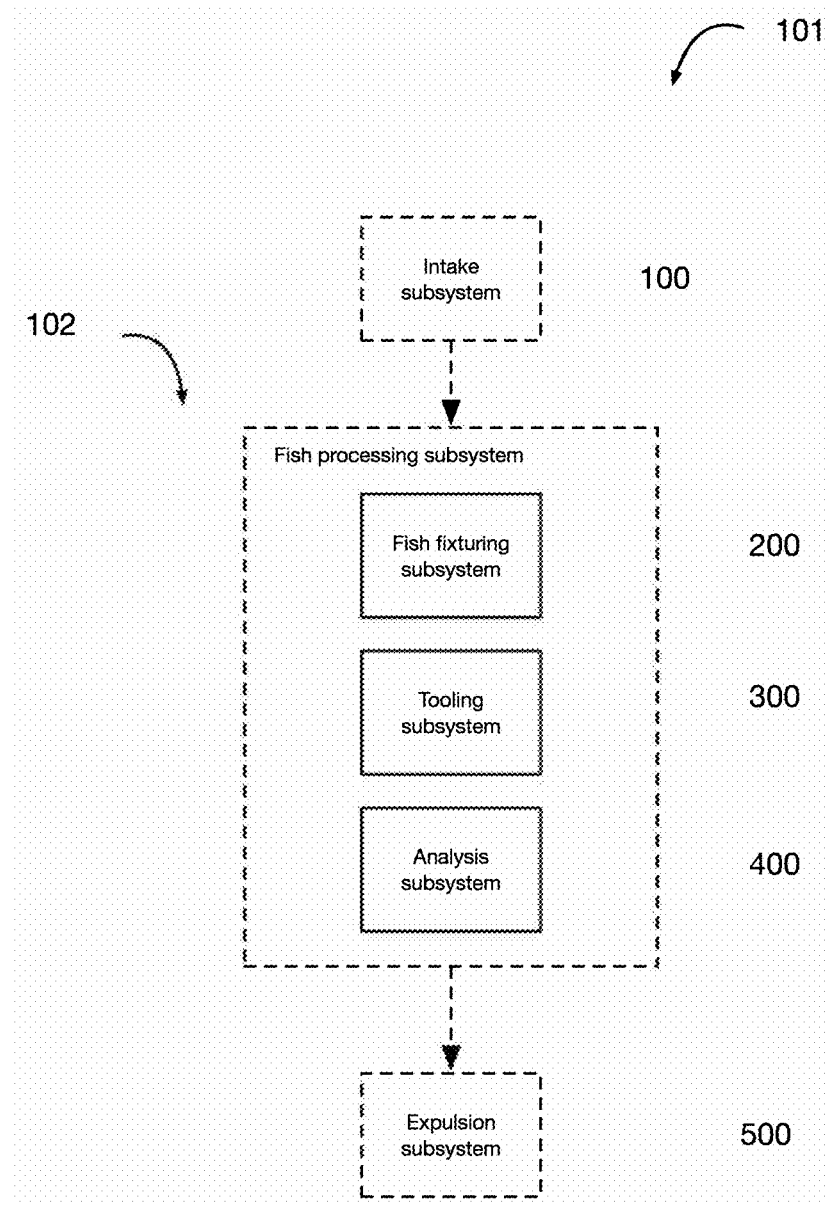
FIG. 1 is a schematic representation of a variant of the system.

As shown in FIG. 1, the system 101 for fish processing can include: a fish fixturing subsystem 200, a tooling subsystem 300, an analysis subsystem 400, and/or any other suitable components, which can optionally be part of a fish processing subsystem 102. Additionally or alternatively, the system 101 can optionally include: an intake subsystem 100, an expulsion subsystem 500, and/or any other suitable components.

In an illustrative example, the system (e.g., an automated fish processing robot) can accept one (or more) live fish, optionally of varying species and size, at a time into a fish processing subsystem 102. Optionally, the fish fixturing subsystem 200 can automatically deploy to fixture the fish in a known location. The analysis subsystem 400 can sample a set of measurements of the fish before, after, and/or during fixturing and determine a set of fish attributes (e.g., species, size, patterns, etc.) based on the set of measurements. Based on the set of measurements, the analysis subsystem 400 can determine whether to confirm processing of the fish, or to reject processing of the fish (e.g., if the fish doesn't meet regulatory requirements associated with size, seasonality, etc.). If rejected, the fish can be released. If processing is confirmed, based on the set of measurements the analysis subsystem 400 can determine a set of tool parameters to control a tooling subsystem 300 to process the fish.

In an illustrative example, the tooling subsystem includes a set of tools, such as a drill, a blade (e.g., an oscillating blade), and/or any other suitable tools. Processing the fish with the tooling subsystem 300 can include performing one or more tooling operations (e.g., drilling operations, cutting operations, etc.). Prior to performing one or more cutting operations, the fish fixturing subsystem 200 can position the fish to align the fish with one or more of the tools, the tooling subsystem 300 can position the tools to align the tools with the fish, and/or the fish can be otherwise positioned. The drill can be used to perform one or more drilling operations (e.g., to euthanize the fish by drilling the brain). In examples, the drill can rotate about the drill axis and translate along the drill axis to puncture the fish. In further examples, the drill can further tilt at an angle relative to the drill axis and/or translate perpendicularly to the drill axis to expand the reach of the drill bit within the brain cavity of the fish. The blade can be used to perform one or more cutting operations (e.g., to exsanguinate the fish by cutting proximally to the gills, the tail, and/or any other suitable location).

However, the system can include any other suitable elements.

2. Technical Advantages

Variants of the technology for automated fish processing can confer several benefits over conventional systems and methods.

First, fish processing is a challenging task to automate due in part to the strength and movement of a live fish, which generally fight to survive after being caught. To overcome these challenges, variants of the system include a live fixturing system that can apply sufficient force to restrain the fish but ensures gentle handling by meeting the fish at a position that minimizes flailing.

Second, variants of the system can adapt to a wide variety of fish species and fish sizes, as variants of the system include moving fixturing and/or tooling (e.g., euthanasia tooling, exsanguination tooling, etc.), which can optionally be adjusted (e.g., automatically adjusted) based on the attributes (e.g., species and/or size) of the fish received. This ensures that a wide variety of fish can be accepted into the system, and that any fish accepted by the system (e.g., as sorted in the intake station) can be euthanized quickly (e.g., with an accurate blow to the brain) and exsanguinated accurately (e.g., thereby yielding a higher quantity of harvestable meat).

Third, variants of the technology can yield a higher quality fish product (e.g., flesh, meat, skin, offal, bones, tail, etc.) by reducing or preventing the fish from undergoing stress prior to euthanasia. As compared to other animals that are harvested for their meat (e.g., cows, pigs, etc.), fish worldwide have very few standards governing humane euthanasia, and are often killed in inhumane ways (e.g., suffocation, gill pull, ice bed method, etc.) that cause the fish to flail and undergo stress before death. Vigorous flailing can reduce fish quality by causing the fish to release lactic acid, which can toughen the meat and worsen the flavor (e.g., due to high muscle pH), and by causing the fish to bruise, leaving dark spots on their meat. Undergoing stress reduce fish quality by causing the fish to release stress hormones (e.g., cortisol) which can lead to drier, worse tasting, duller colored, and/or otherwise lesser quality meat. The technology can minimize fish stress by shortening a time in which the fish can release stress hormones (e.g., by rapidly and accurately killing the fish), keeping the live fish in an intake station that constitutes a stress-free environment (e.g., a dark environment, a wet environment, an environment in which fish swim upstream against a current, etc.), and/or otherwise reduce stress. Reduced fish stress levels can confer the benefits of: reducing suffering of the fish prior to euthanasia, reducing or entirely preventing the fish from releasing stress hormones (e.g., cortisol) that may produce lower quality meat, struggling to escape the system (which may inadvertently cause damage to system hardware), and/or other benefits. Variants of the technology can employ techniques, benefits, and/or goals of the ikejime method and/or variants thereof, which includes euthanizing fish with one or more sharp blows to the head. The process requires great precision, but is one of the most humane methods of killing fish, results in the lowest levels of stress to the fish, and improves food quality.

Fourth, variants of the technology euthanize the fish by inducing brain death in the fish, which poses several additional benefits. For example, the inventors have discovered that because the fish heartbeat persists for a duration of time (e.g., several seconds, several minutes, etc.) after brain death, when the fish is subsequently cut within a threshold window of time (e.g., several seconds, several minutes, etc.), it will self-exsanguinate by pumping out its own blood.

However, the technology can confer any other suitable benefits.

3. System

As shown in FIG. 1, the system 101 for fish processing can include: a fish fixturing subsystem 200, a tooling subsystem 300, an analysis subsystem 400, and/or any other suitable components. Additionally or alternatively, the system 101 can optionally include: an intake subsystem 100, an expulsion subsystem 500, and/or any other suitable components.

The system preferably functions to kill and exsanguinate a live fish. However, the system can additionally or alternatively function to collect fish bio data, sort live fish, post-process slaughtered fish, and/or otherwise function. The system is preferably configured to process multiple varieties of fish, but can alternatively be configured to process a single type of fish. The system can be installed and/or operated onboard a shipping vessel (e.g., a fishing vessel), on land (e.g., near a fish farm, in a seafood processing plant, etc.), and/or otherwise used.

Any or all stations, subsystems, and/or regions of the system can include a humidifying element (e.g., misters, hoses, sprinklers, etc.). Humidifying elements can operate: continuously, periodically, upon request, and/or at any other frequency.

The system can optionally include one or more transportation subsystems, which can function to move the fish between stations and/or in and out of the system. Transportation subsystems can include driven or passive conveyance mechanisms. In a first variant, the transportation subsystem utilizes gravity to passively move the fish between stations. In an example, each subsequent station is located lower than the prior station. In a second variant, the transportation subsystem includes a controlled flow element (e.g., hoses, water jets, etc.). In an example, the controlled flow element induces a stream of water that moves in an opposing direction to an intended fish movement path so that the fish swims against the stream of water. In another example, the controlled flow element flows downstream and pushes the fish toward the subsequent station. In a third variant, the transportation subsystem includes a conveyor belt to move the fish between stations. In a fourth variant, the transportation subsystem includes a force element that applies a force on the fish to actively move it between stations. Any combination of the variants can be used for transporting a fish through the system. However, the fish can be otherwise transported. Alternatively, any or all of the processes described herein can be performed in one location (e.g., in a single fish processing device).

Figure 2:
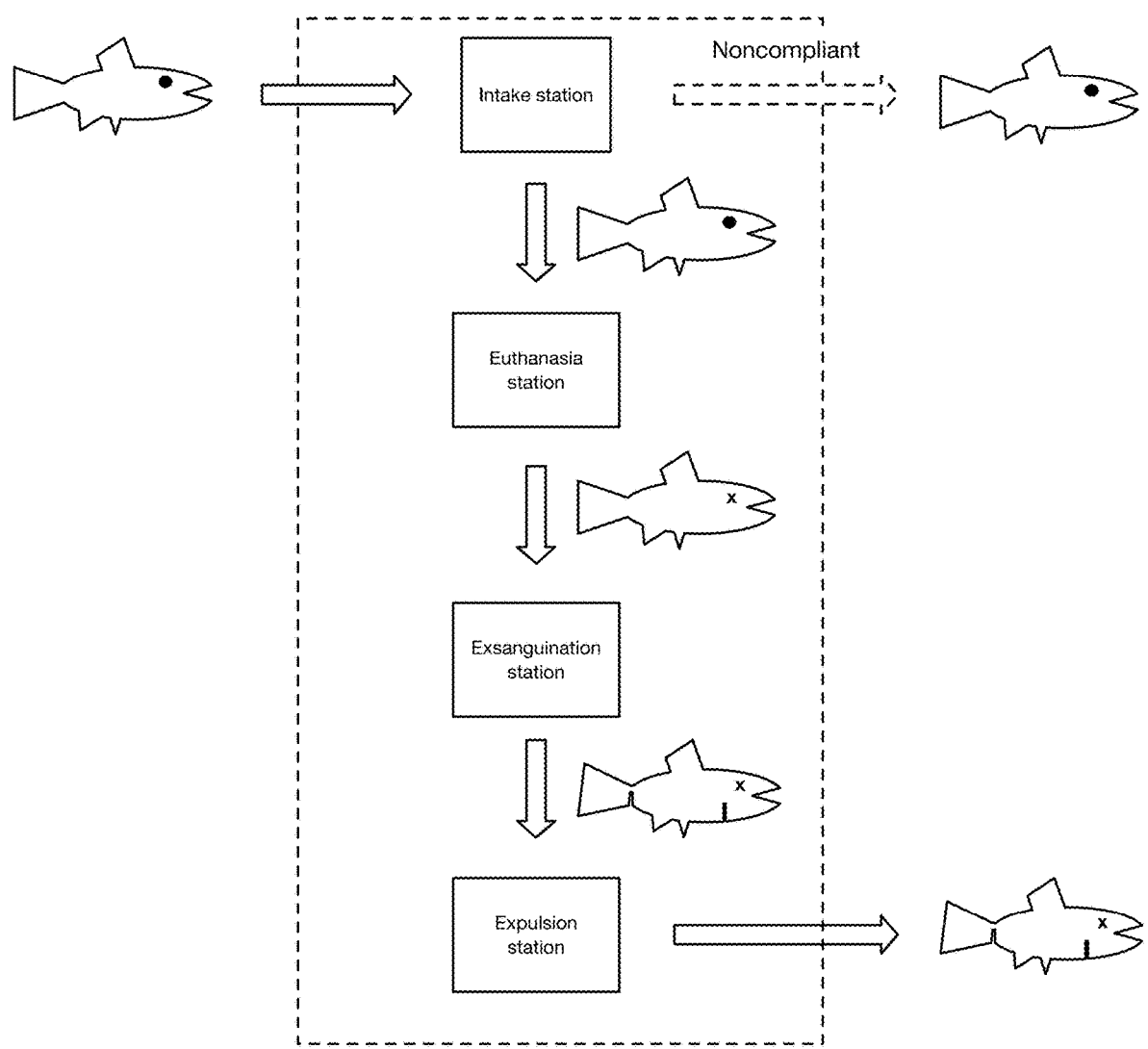
FIG. 2 is a schematic representation of a variant of the system.
Figure 3A:
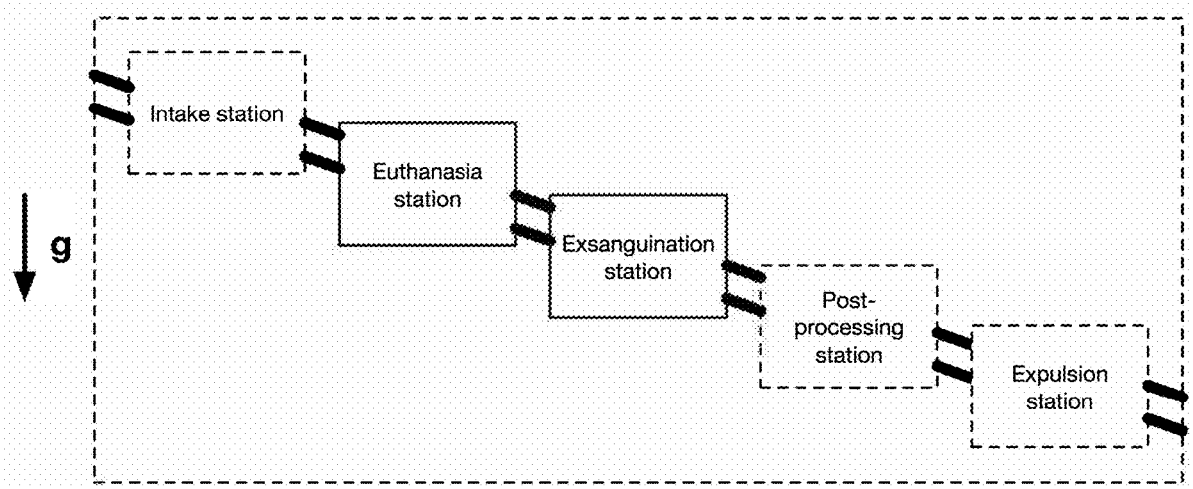
FIGS. 3A and 3B are illustrative and schematic representations of variants of the system, respectively.

In a specific example (e.g., example shown in FIG. 2), the system for fish processing can include: an intake station, a euthanasia station, an exsanguination station, a post-processing station, and an expulsion station. The intake station (e.g., a fish processing subsystem) can include: a receptacle; a corral system; and a sorting system, which can include a set of sensors and an egress gate system. The euthanasia station (e.g., a fish processing subsystem) can include: a set of sensors; a live fixturing mechanism; a euthanasia mechanism; and a euthanasia control system which controls the euthanasia mechanism and can plan a euthanasia trajectory based on measurements sampled by the set of sensors. The exsanguination station (e.g., a fish processing subsystem) can include: a set of sensors; a dead fixturing mechanism; a set of exsanguination mechanisms; and an exsanguination control system which controls the exsanguination mechanism and can plan an exsanguination trajectory based on measurements sampled by the set of sensors. In the specific example, the fish can optionally be transported between stations by taking advantage of gravity (e.g., example shown in FIG. 3A), wherein all stations are positioned at an angle relative to one another, and the fish travels along chutes when a gate is opened between stations. Optionally, a controlled flow element assists fish transportation by providing lubrication and/or a flushing force to transport the fish between stations. However, the stations can alternatively be co-located in one position, wherein at least two of: intake, euthanasia, and/or exsanguination occur in the same station.

Preferably, if the system includes multiple stations, the stations of the system are arranged such that each subsequent station is positioned lower than the station before. In an example, stations are arranged such that each station is adjacent to but lower than the station before (e.g., positioned at an angle between 0 and 90 degrees relative to the prior station and the gravity vector, between 30°-60° relative to a gravity vector, 45° relative to a gravity vector, etc.). In a second example, stations are arranged such that the stations are vertically stacked. Alternatively stations can be arranged on the same horizontal plane, collocated in space (e.g., overlap), and/or otherwise arranged. The system and/or each station can define a bottom side (e.g., the side closest to the ground plane), top side, bottom side, front side, back side, and/or otherwise defined. Each station can define a bottom side and a top side (e.g., the side furthest from the bottom side). Each station can include walls along one or more of the sides, be unenclosed, or be otherwise enclosed. Preferably, the bottom side is angled relative to the gravity vector, but can alternatively be perpendicular to the gravity vector.

Each station preferably has a fish ingress and a fish egress. However, the station can alternatively have one opening that serves as both the ingress and the egress. The ingress and the egress can be located across from one another (e.g., wherein the ingress is located along a back side of the station and the egress is located along a front side of the station, wherein the ingress and the egress are located on lateral sides of the station, etc.). Alternatively, the egress can be located adjacent to the ingress. Preferably, the ingress is located higher than the egress (e.g., wherein the bottom side of the station is angled relative to the gravity vector, wherein the ingress is at the top of the station and the fish is dropped into the station, etc.). Alternatively the ingress and the egress can be located at any side of the station.

However, the system can include any other elements.

3.1 Intake Subsystem 100

The system can optionally include an intake subsystem 100, which can function to receive a live fish. The intake subsystem can optionally further function to ensure that one fish at a time enters the fish processing subsystem.

The fish 11 can pass through the intake subsystem 100 prior to entering the fish processing subsystem 102. However, the system can alternatively not include an intake subsystem (e.g., wherein the fish is received directly at the fish processing subsystem), the intake subsystem can be a component of the fish processing subsystem, and/or the system can be otherwise configured.

In a preferred embodiment, the intake subsystem is located upstream of the fish processing subsystem, wherein the intake subsystem is located physically higher (e.g., relative to the ground) than the fish processing subsystem. Optionally, a chute connects the intake subsystem to the fish processing subsystem so that the fish can be released (e.g., by lever, by opening of a door, etc.) from the intake subsystem to the fish processing subsystem and move by gravity between these respective stations. Additionally or alternatively, the intake subsystem can be located on a same level as and/or lower than the fish processing subsystem, with additional mechanisms that enable the system to transport the fish between these respective stations (e.g., water jets to create a current that the fish is instinctually inclined to swim against, moving platforms, conveyors, etc.), and/or otherwise configured.

In a first variant, the intake subsystem can include an opening (e.g., a hole, a shoot, a door, etc.) that a fish is dropped into (e.g., one at a time, in batches, etc.). The fish can be dropped into the opening by an operator (e.g., an operator holding the fish in a net), a machine, and/or any other suitable entity.

In a second variant, the intake subsystem can include a tank that receives a plurality of fish, and a corral subsystem (e.g., including gates, ridges arranged to allow movement in only one direction, selective hoses, narrow regions large enough for only a single fish, etc.) that selectively enables a batch of fish at a time (e.g., one fish at a time) to enter the fish processing subsystem or to direct the fish to the expulsion subsystem. Optionally the corral subsystem can include a fish regulator. The fish regulator preferably has two gates which the fish gets sorted through based on the data collected by the measurement system. One gate leads to the euthanasia station. The other gate leads to an expulsion outlet (e.g., a gate, a door, a chute, an expulsion station as described herein, etc.).

In a third variant, the intake subsystem can include and/or interface with an analysis subsystem (e.g., the same or different as used in the fish processing subsystem) comprising a set of models that determine a set of fish attributes (e.g., size, species, defects, etc.) based on a set of measurements (e.g., images) of the fish in the intake subsystem. A set of sensors (e.g., cameras) can be configured to sample the set of measurements, and the analysis subsystem can be configured to selectively only enable fish to pass from the intake subsystem into the fish processing subsystem if they meet a set of criteria (e.g., size surpasses a threshold, species in season, etc.). In an example, if the analysis subsystem determines that the fish fails the set of criteria, the corral subsystem can directly expel the fish, rather than pass it to the fish processing subsystem.

However, the intake subsystem can be otherwise configured, and/or include any other suitable components.

3.2 Fish Processing Subsystem 102

The system can optionally include a fish processing subsystem 102 (e.g., referred to equivalently herein collective as a station or stations), which can function to process a fish by executing the functionality of one or more subsystems (e.g., fixturing, tooling, and analysis) in a unified station. Additionally or alternatively, the system can include multiple stations to execute consecutive operations.

The fish processing subsystem 102 preferably includes the fish fixturing subsystem 200 (e.g., referred to equivalently herein as a live fixturing mechanism), tooling subsystem 300, analysis subsystem 400, and/or any other suitable elements. Additionally or alternatively, 102 can include the intake subsystem 100, the expulsion subsystem 500, and/or any other suitable components. Additionally or alternatively, 102 can include any combination of the fish fixturing subsystem 200, tooling subsystem 300, and analysis subsystem 400 (e.g., a sorting station with a fish fixturing subsystem and an analysis subsystem, a processing station with a fish fixturing subsystem and a tooling subsystem, etc.).

Figure 6A:
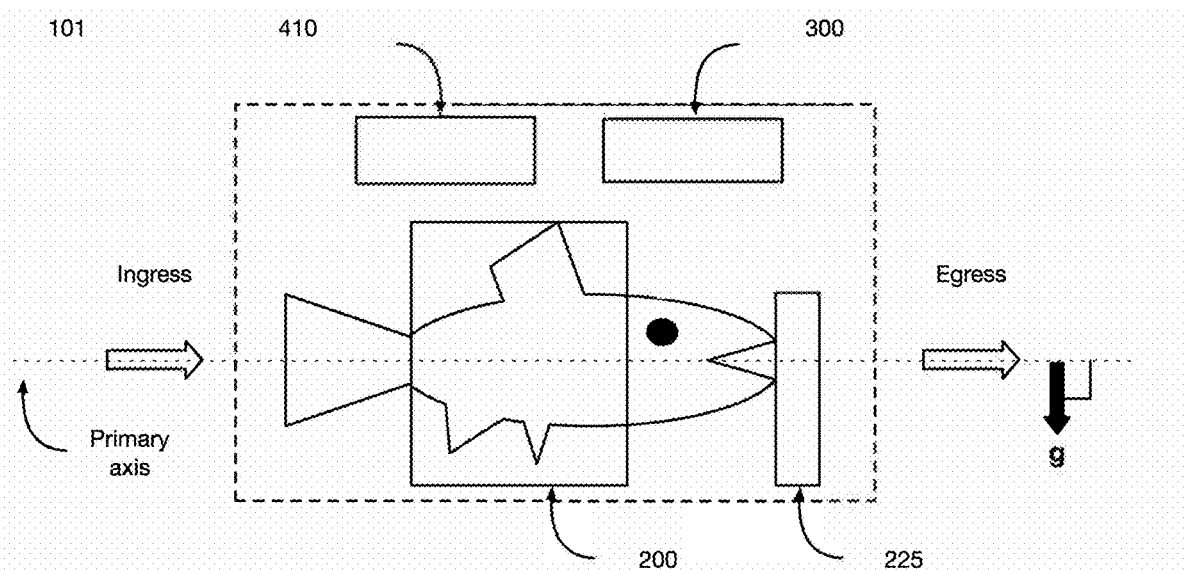
FIGS. 6A and 6B are illustrative representations of variants of a euthanasia station.
Figure 6B:
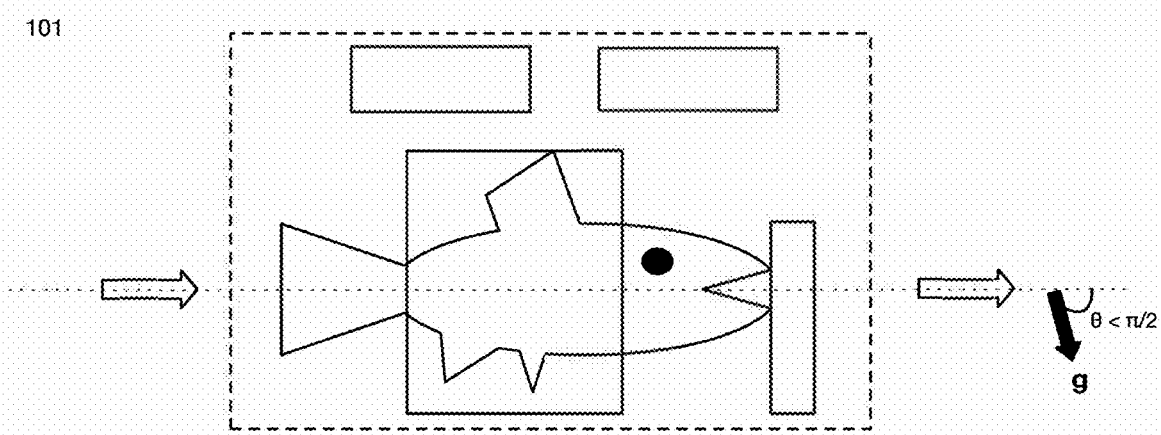

The fish processing subsystem 102 (e.g., an exsanguination station, a euthanasia station, etc.) can be defined by a primary axis (e.g., longitudinal axis), which points in the direction of a preferred orientation of the fish (e.g., wherein the spine of the fish when fixtured is parallel with the primary axis). However, the primary axis can be otherwise oriented relative to the fish. Generally, the fish processing subsystem has at least an ingress, an egress, a top side, and a bottom side, but can be otherwise defined. The transportation subsystem optionally transports the fish into the fish processing subsystem head-first or tail-first, but can alternatively drop the fish in horizontally, or from any other orientation. The primary axis can intersect the ingress (e.g., wherein the fish is transported head-first into the station, example shown in FIGS. 6A and 6B), lie below the ingress (e.g., wherein the fish is dropped into the station), and/or be otherwise oriented relative to the ingress.

Preferably, the fish processing subsystem is located with and/or defines an enclosed and dark chamber, which can minimize fish stress by reducing exposure to light, but the fish processing subsystem can additionally or alternatively be in an open environment, enable light to enter and/or include lighting elements, and/or be otherwise configured.

In variants, the fish processing subsystem can be defined by a base and a top. The base can be relatively proximal (e.g., as compared to the top) to a reference base plane defined by the earth, a floor (e.g., a floor of a fish processing facility, the deck of a boat, etc.), and/or any other suitable surface in which the fish processing subsystem is used or installed. Preferably, the base of the fish processing subsystem is angled at a downhill slant relative to the reference base plane (e.g., see FIG. 6B). Preferably the downhill slant is less than 90 degrees (e.g., <90°, <85°, <80°, <75°, <70°, <65°, <60°, <55°, <50°, <45°, <40°, <35°, <30°, <250, <20°, etc.), which can enable the fish processing subsystem to take advantage of gravity to position the fish snugly at a known position (e.g., wherein the fish is rested against the nose of the fish within the system) rather than physically moving the fish to said position. However, the base can be substantially parallel to the base plane, and/or otherwise configured. The fish processing subsystem can additionally or alternatively be defined by one or more sides (e.g., a front end, rear end, left, right, etc.), walls (e.g., exterior sides), and/or any other suitable geometry. Additionally or alternatively, the fish processing subsystem can include an internal translation mechanism (e.g., rollers, track, treads, belt, water stream or jet, etc.), wherein the translation mechanism can be configured to move the fish between locations of the fish processing subsystem (e.g., from a first location where a first set of processing steps are executed to a second location where a second set of processing steps are executed, optionally further to a third location where a third set of processing steps are executed etc.).

In a first variant, one station can include fixturing, tooling, and analysis subsystems, and be configured to execute multiple processing steps concurrently (e.g., to increase throughput) or consecutively (e.g., to ensure that the fish is fully euthanized prior to executing subsequent tooling operations). A benefit of the first variant includes a reduced machine size, as multiple steps are performed at one station (e.g., as opposed to prior art where separate fish processing operations are often performed at different machines altogether). Optionally, the multiple processing steps are performed without re-fixturing the fish between steps, which can further save time and power costs. In a first example, one station performs euthanasia and exsanguination. In a second example, one station performs euthanasia, exsanguination, and further processing (e.g., filleting).

Figure 3B:
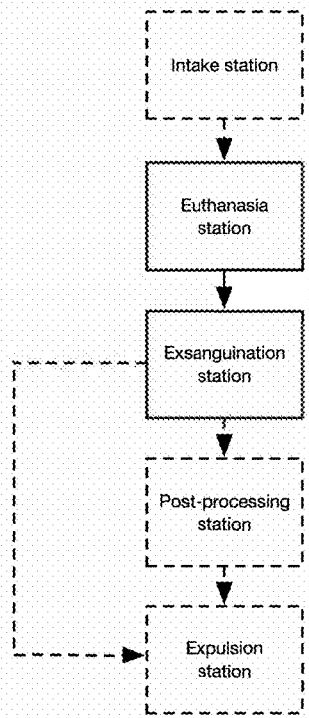

In a second variant, two or more stations can be configured to separately execute consecutive processing steps (e.g., two or more stations within a unified fish processing system). Multiple stations can be configured to perform one or more of: euthanasia, exsanguination, post-processing, intake, expulsion, and/or any other suitable steps. In an example (e.g., example shown in FIGS. 3A and 3B), a first station can be configured to perform euthanasia and a second station can be configured to perform exsanguination. Optionally, either of the euthanasia station and/or the exsanguination station can further be configured to perform any additional steps (e.g., intake, post-processing, expulsion, etc.). Optionally, one or more additional stations can be configured to perform any additional steps (e.g., intake, post-processing, expulsion, etc.).

In a third variant, the system can include multiple (e.g., two or more) duplicate stations configured to process multiple fish in parallel (e.g., to increase system throughput). In examples, the system can include a row of fish processing subsystems, wherein individual fish are corralled one at a time into the individual fish processing subsystems. Optionally, the fish can be sorted based on one or more attributes (e.g., species, size, quality, etc.) and then directed (e.g., via the corral and gating system described herein) to a particular station based on the attributes (e.g., a station configured to process a fish matching the one or more attributes).

In a fourth variant, separate versions of the system can be produced, wherein the respective systems and their fish processing subsystems 102 serve specialized functionalities (e.g., two or more stations within a separate but compatible fish processing systems). This variant can enable the system to be more easily integrated into existing fish processing assembly lines without a total system overhaul. In a first example, a first version of the system can be produced for performing euthanasia, and a second version of the system can be produced for performing exsanguination. Optionally, a third version of the system can be produced for performing one or more post-processing steps (e.g., filleting, packaging, post-inspection, etc.). In a second example, a first version of the system can be produced for performing euthanasia and exsanguination, and a second version of the system can be produced for performing one or more post-processing steps (e.g., filleting, packaging, post-inspection, etc.). In a third example, a first version of the system can be produced for performing intake, and one or more subsequent versions of the system can perform one or more subsequent processing steps.

The exsanguination station can optionally include a bleeding area and/or active bleeding elements, which can function to hold the fish during bleeding. The bleeding area can be the same as one or more of the tooling areas (e.g., the cutting area), or a separate container (e.g., a water container). The exsanguination station and/or the bleeding area can optionally further include: volume of liquid (e.g., exsanguination via osmosis), pressurized fluid (e.g., forcibly ejecting blood from the exsanguination cuts), hosing (e.g., to pump water into the area), cooling agents (e.g., ice, air conditioning, etc.), drainage (e.g., grates, holes, side channels, etc.), a coating, and/or any other element.

However, the fish processing subsystem can be otherwise configured, and/or include any other suitable components.

3.3 Fish Fixturing Subsystem 200

The system can include a fish fixturing subsystem 200, which can function to restrain the fish and enable to system to perform one or more: tooling actions (e.g., cuts), physical manipulations of the fish, measurement collections, and/or any other action pertaining to a restrained fish. Restraining the fish (e.g., during a tooling action, during measurement sampling, etc.) can: enhance the accuracy of the tooling action, reduce the complexity of planning the tooling action, reduce a number of degrees of freedom required for a set of tools to perform the tooling action, increase model accuracy and/or reduce model complexity (e.g., by enabling measurements to be sampled under controlled conditions), and/or confer any other suitable benefits.

Restraining the fish can include: immobilizing the fish from moving in one or more directions; contacting the fish at one or more locations; preventing translation of the fish in one or more directions; preventing rotation of the fish about one or more axes; and/or any other suitable actions.

Preferably, the fish fixturing subsystem 200 orients the fish upright (e.g., vertically) within the fish processing subsystem, wherein the belly of the fish is relatively proximal to the base of the fish processing subsystem and the spine of the fish is relatively proximal to the top of the fish processing subsystem (e.g., wherein a long axis of the fish is substantially parallel to the base and the top of the fish processing subsystem), which can confer the benefit of enabling the fish fixturing subsystem to control an alignment of the fish within the system as fish are generally substantially symmetric about their sagittal plane. However, the fish fixturing subsystem can additionally or alternatively fixture the fish: lying on its side (e.g., against the base), with the nose of the fish is relatively proximal to the top of the fish processing subsystem and the tail of the fish is relatively proximal to the base of the fish processing subsystem, upside down, angled relative to the base and/or the top, and/or at any other suitable orientation. Preferably the fish fixturing subsystem 200 orients the fish in a forward-facing direction within the fish processing subsystem, wherein the fish enters (and optionally also exits) the fish fixturing subsystem face-first. However, the fish fixturing subsystem can additionally or alternatively orient the fish: in a backward-facing direction, sideways (e.g., wherein the fish laterally enters the fish fixturing subsystem), and/or in any other suitable direction.

The fish fixturing subsystem 200 (e.g., referred to equivalently herein as a fish fixturing mechanism) preferably includes any or all of: a restraining material 210, a set of manipulators 220, a set of actuators 230, and/or any other suitable components.

Preferably, the fish fixturing subsystem 200 does not obstruct and/or otherwise restrict a tooling pathway. However, the tooling pathway can additionally or alternatively be adapted to bypass the fish fixturing subsystem.

Preferably, the fish fixturing subsystem 200 does not obscure a measurement pathway (e.g., the fish fixturing subsystem does not visually obscure or obstruct an imaging system), which can confer numerous benefits, such as: enabling imaging to take place in the same location as interventions (e.g., to improve accuracy of drilling and/or cutting); enabling imaging to take place at the same time or close in time (e.g., within seconds, within 1 second, within 2 seconds, etc.) with interventions (e.g., to increase an efficiency and/or throughput of the system); and/or any other benefits. In a first example, if the measurements comprise exterior imagery, the restraining material (and/or the set of manipulators) can include a transparent (e.g., clear) and/or semi-transparent material (e.g., clear vinyl). In a second example, if the measurements comprise interior imagery, the restraining material (and/or the set of manipulators) can include a material compatible with the respective interior imagery modality (e.g., plastics for an x-ray, etc.). In a third example, if the measurement subsystem includes a sensor that must make contact with the fish to collect a measurement (e.g., tactile sensors, force sensors, etc.), the fish fixturing subsystem is not physically in the way of the sensor (e.g., not located between the sensor and the fish). In a fourth example, the fish fixturing subsystem includes materials that are not electrically reactive with a set of sensors (e.g., electrical sensors) used to gather the measurements. However, the measurement pathway can additionally or alternatively be adapted to bypass the fish fixturing subsystem.

The restraining material 210 can function to directly restrain (e.g., hold, work hold, compress, etc.) the fish. In variants, the restraining material can function to hold a live fish in place for euthanasia (e.g., a live fish fixture), to hold a euthanized fish in place while it is lacerated by an exsanguination mechanism (e.g., a dead fish fixture) and/or processed by another set of tools, and/or otherwise function.

Generally, the restraining material is in direct contact with at least a portion of the fish, but can alternatively not be in direct contact with the fish (e.g., when the fish is held in a tank of water, the restraining material including the walls of the tank is not generally in contact with the fish). The position of the restraining material can be: fixed within the fish processing subsystem and/or variable (e.g., including one or more: translational axes, rotational axes, etc.) within the fish processing subsystem, wherein the position of the restraining material is controlled by a control subsystem.

In a preferred embodiment, the restraining material 210 is a clear and flexible material. Examples of clear flexible restraining material 210 can include: vinyl, plastics, and/or any other suitable materials. However, additional or alternative embodiments can be produced (e.g., clear and inflexible, flexible and not clear, etc.).

Preferably, the restraining material 210 is clear (e.g., see-through, transparent, etc.), thereby enabling vision sensors (e.g., cameras) to sample images of the fish through the restraining material, which can enable: computer vision models to be used to analyze the fish, additional data to be collected about the fish, and/or other suitable benefits. However, the restraining material can additionally or alternatively not be clear (e.g., when interior imagery such as x-ray is sampled).

Further preferably, the restraining material 210 is flexible with a high degree of plasticity (e.g., material can be configured to bend without breaking, material can undergo plastic deformation under an applied stress by a fish and return to its original shape when the applied stress is removed, etc.) and a low level of elasticity (material does not exhibit elastic deformation under an applied stress by a fish). A benefit of the preferred highly plastic and inelastic flexible material is that the restraining material can accommodate both the size and contours of a variety of fish (e.g., which enables the system to accept a wider variety of fish) while still firmly and fully restraining the fish (e.g., preventing movement of a live fish within the fish fixturing subsystem). However, the restraining material can additionally or alternatively be: flexible with a high degree of plasticity and a high degree of elasticity (e.g., material deforms elastically under an applied stress by a fish and return to its original shape when the applied stress is removed, etc.), flexible with a low degree of plasticity and a high degree of elasticity, semi-flexible (e.g., flexible with moderate degrees of elasticity and/or plasticity), inflexible (e.g., to rigidly restrain the fish), rigid, elastic, and/or otherwise configured.

Further preferably, the restraining material 210 is fabricated as one or more sheets of restraining material (e.g., vinyl sheet, vinyl wrap, etc.), which can confer the benefits of: simultaneously vertically and laterally restraining the fish, fully securing the fish without the possibility of slipping out as the fish has no holes to slip through in the sheet, minimizing or preventing localized stress risers (e.g., stress risers that would normally arise from rigid elements or flexure joints because the sheet is structureless/amorphic, and/or other suitable benefits. However, the restraining material can additionally or alternatively be configured as: an end effector (e.g., a set of one or more claws, grippers, clamps, etc.), straps, sliders, a set of work holding components, and/or any other suitable form.

The fish fixturing subsystem 200 can include a set of one or more manipulators 220 (e.g., members), which can function to manipulate (e.g., position) the restraining material and/or the fish. In examples, manipulators (e.g., manipulators that manipulate the restraining material) can include: a set of rollers, a cinching mechanism, a support 222 (e.g., a moveable base), and/or any other suitable form. In further examples, manipulators (e.g., manipulators that manipulate the fish) can include: a robotic limb (e.g., arm, hand, finger, etc.), a bumper (e.g., a nose plate), and/or any other suitable form. The position of any of the manipulators (e.g., rollers, cinching mechanism, support 222, etc.) can be: fixed within the fish processing subsystem and/or variable (e.g., including one or more: translational axes, rotational axes, etc.) within the fish processing subsystem, wherein the position of the manipulators is controlled by the control subsystem.

Figure 16:
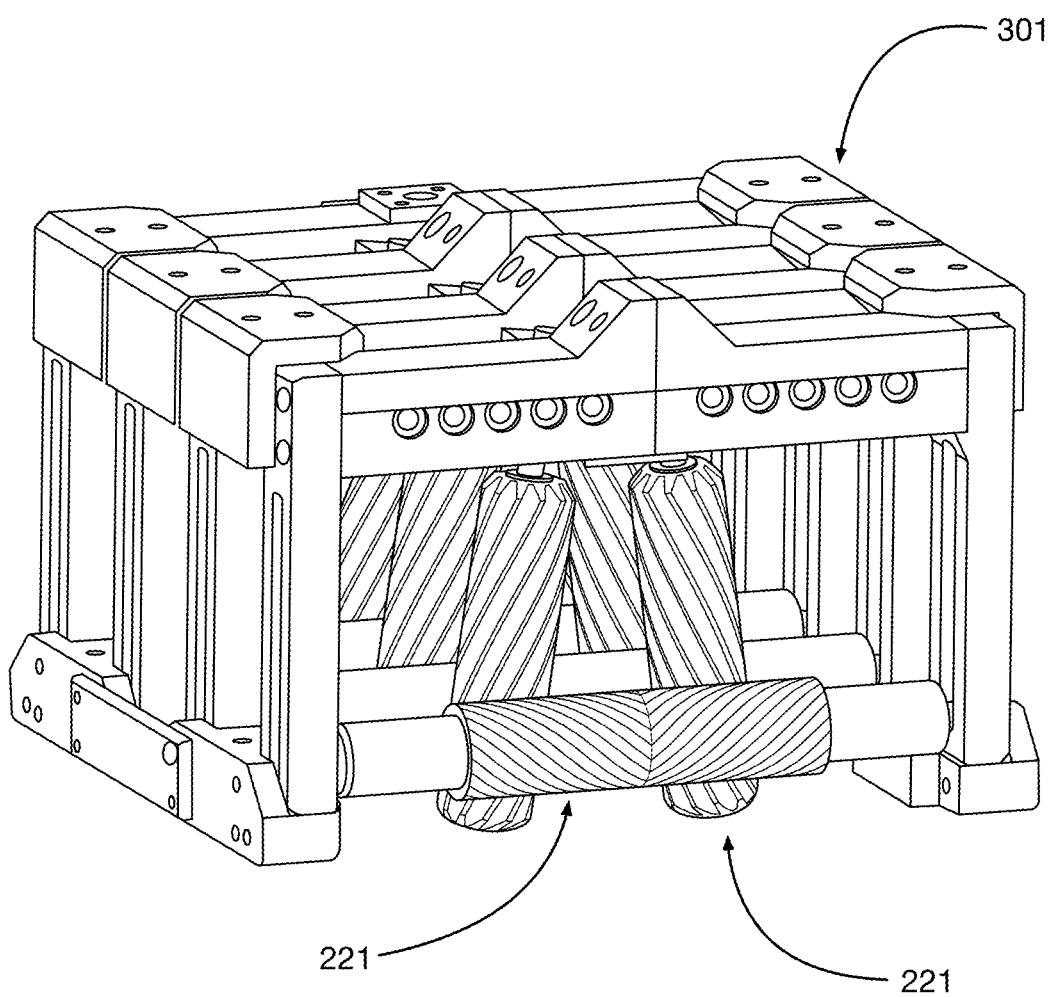
FIG. 16 is an illustrative example of a variant of the system including a plurality of rollers.

The set of manipulators 220 can optionally include a set of rollers 221 (e.g., rigid rollers) to unroll and roll (e.g., deploy) the sheet(s) of restraining material, and/or manipulate any other components. Preferably, the rollers are located proximal to the top of the fish processing subsystem 102, wherein the fish is located below the rollers. However, the rollers can additionally or alternatively be located: below the fish, in front of the fish, behind the fish, on one or more sides of the fish, and/or otherwise located. Optionally, when unrolled, the system can leave a gap between the fish and the rollers, and when deployed, the rollers can roll up the restraining material until no gap remains (e.g., the gap is 0 cm, the gap is 0 cm and the fish is compressed, etc.) between at least a portion of the fish and the rollers. Optionally, the lack of a gap, a tension metric, and/or any other suitable value to indicate cessation of rolling can be determined by the analysis subsystem. Preferably, the set of manipulators 220 can include two rollers, but can additionally or alternatively include one roller, more than two rollers, no rollers, and/or any other suitable number of rollers. In optional variants, when multiple rollers (e.g., more than two rollers) are included in the system, the additional rollers can: serve as tensioning elements, serve as a means of transporting the fish (e.g., a conveyor), and/or otherwise function. In a specific example (e.g., shown in FIG. 16), the fish fixturing subsystem can include a plurality of rollers 221 oriented in any of: a horizontal, vertical, and/or any other angle relative to the fish fixturing subsystem, which can transport the fish through the fish fixturing subsystem until the fish reaches a desired position, and then cease rotating to hold the fish at the desired position.

Additionally or alternatively, the set of manipulators 220 can optionally include: clamps and/or grippers (e.g., to grab and pull the restraining material), sliders (e.g., wherein the restraining material is coupled to the sliders) and/or rails (e.g., to fold/unfold) the restraining material, a rotary joint (e.g., around which the restraining material itself can rotate/pivot), conveyors, pulleys, tensioning systems, winches and/or hoists, and/or any other set of manipulators.

The set of manipulators 220 can optionally include a support 222 on which the fish can rest. Preferably the support 222 is rigid (e.g., wherein the support 222 serves as a structural member), which can enable the fish fixturing subsystem 200 to support the weight of the fish, to accurately align the fish within the fish fixturing subsystem, and to maintain a position of the fish (e.g., so that the fish cannot move as a tool performs a tooling operation on the fish such as cutting, drilling, etc.). However, the support 222 can additionally or alternatively be pliant, padded (e.g., so that the fish does not bruise do to the force of its own weight resting on the base), and/or otherwise configured. The support can be transparent or opaque.

In a preferred variant, the support 222 is grooved (e.g., with a u-groove, v-groove, square channel, etc.) and the long axis of the fish is optionally aligned with the groove 223, which can help orient the fish in an upright position within the fish fixturing subsystem as the groove provides a rigid resting point for the fish that opposes the fish's flapping within the fish fixturing subsystem as the restraining material tightens the fish and forces a component of the fish (e.g., a ridge along the underbelly of the fish) into the groove. However, the support 222 can additionally or alternatively be: flat (e.g., wherein the fish is fixtured to lie flat against the base), curved (e.g., in which the fish is fixtured to rest within the concavity of the curve), and/or have any other suitable geometry. Optionally, the support 222 can be tilted to guide and/or translate the fish along the support (e.g., until the fish hits the bumper 225). Additionally or alternatively, the could be a mechanism to facilitate movement along the support (e.g., flowing water, a belt, etc.) and/or any other suitable mechanism.

The support 222 (and/or any other components of the fish fixturing subsystem 200) can optionally include one or more holes 224, each larger than a particular cutting tool of the set of cutting tools, such that the one or more tools can extend through a respective hole (e.g., when actuated). In a specific example, the support 222 includes a hole that a cutting tool passes through (e.g., vertically, at an angle, etc.) to cut the fish.

Figure 7A:
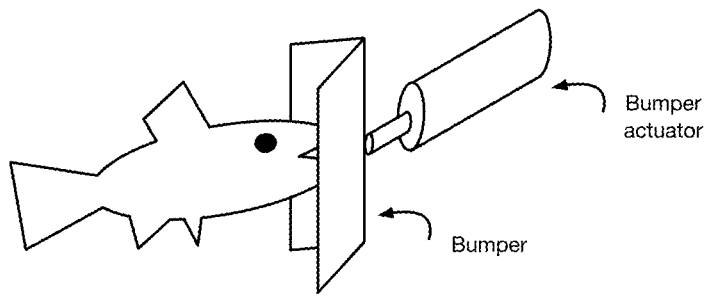
FIGS. 7A-7E are illustrative representations of variants of a nose stopper.
Figure 7B:
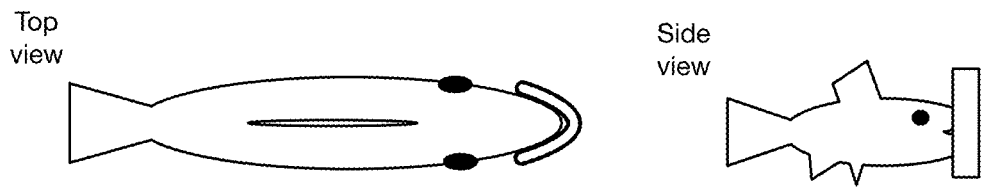
Figure 7C:
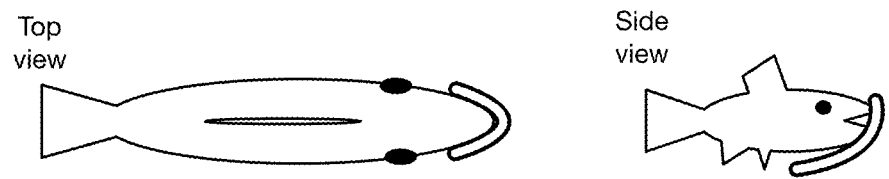
Figure 7D:
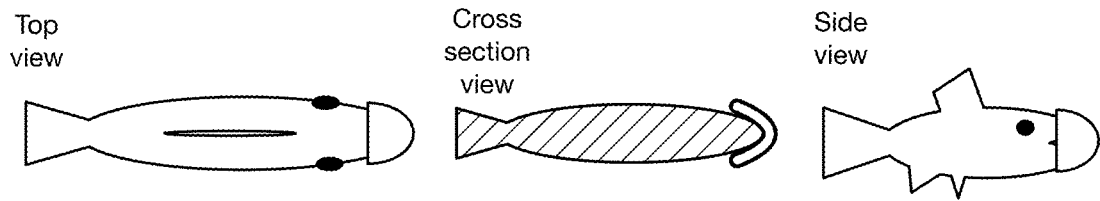
Figure 7E:
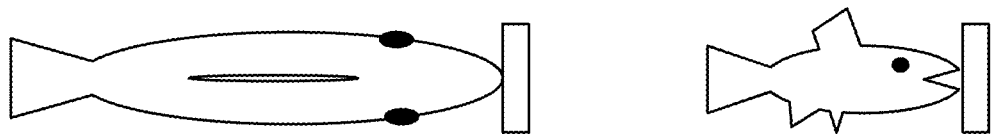
Figure 17A:
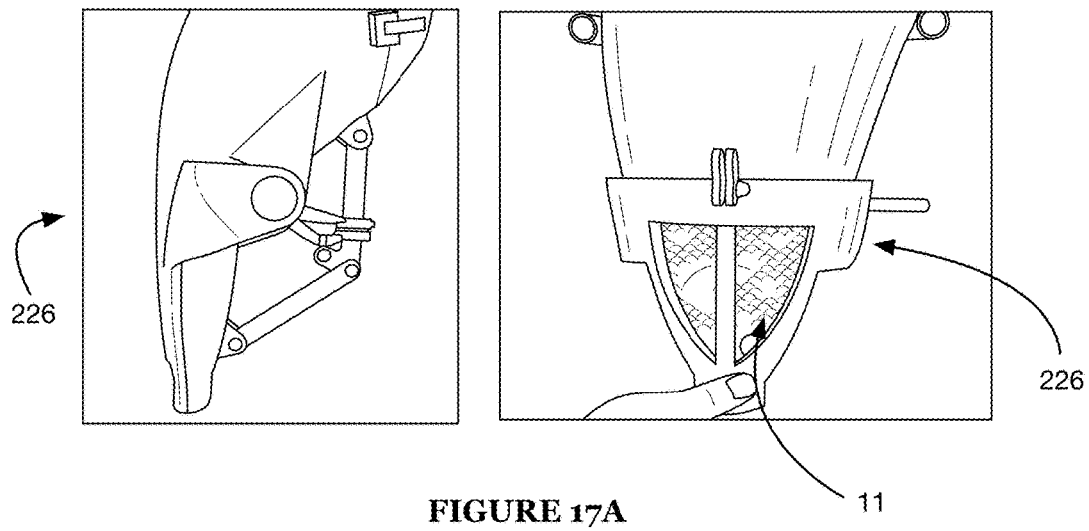
FIGS. 17A and 17B are illustrative representations of variants of fish fixturing subsystems including stoppers.
Figure 17B:
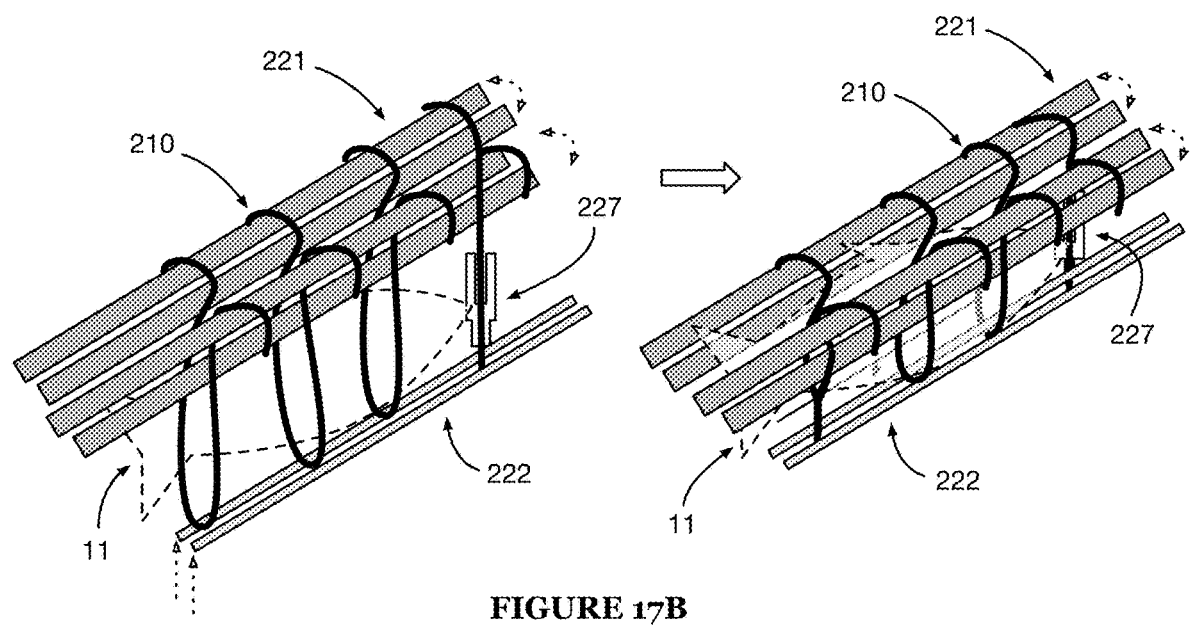

The set of manipulators 220 can optionally include one or more bumpers 225 (e.g., referred to equivalently herein as a stopping mechanism), which can function to control a movement of the fish in one or more additional directions (e.g., beyond the direction(s) controlled by the restraining material 210 and/or the manipulators 220). In examples, the bumper 225 can stop the fish from further moving relative to other components of the fish fixturing subsystem (e.g., vinyl sheet, support, etc.). Optionally, the bumper can be a moving element (e.g., a passively moving element, controlled by the control subsystem, etc.) that moves the fish to position it for a processing operation (e.g., position fish gills above the cutting element, position fish so that the brain is within range for a target operation such as drilling, etc.). In variants, the bumpers can be located at one or more of: cranially relative to the fish (e.g., a nose stopper/face fixturing element to restrain the fish from moving forward, etc.), caudally relative to the fish (e.g., restraint the tail which could theoretically thrash around in some systems even if the fish sides are restrained), below the fish (e.g., to support the weight of the fish), above the fish, around the fish, on any side of the fish (e.g., to control lateral movement), and/or any other suitable location. The stopping mechanism can be located proximal to the front end (e.g., distal end relative to the fish ingress) rear end, bottom side and/or top side of the station, and/or otherwise located. The stopping mechanism can be actuated: automatically (e.g., piston actuated, by the fixturing mechanism, etc.), by the fish (e.g., wherein fish contact on a lever pushes the nose block up), by a spring, and/or otherwise actuated. The stopper (e.g., examples shown in FIGS. 7A-7E) can be flat (e.g., a block, a plate, example shown in FIG. 7B etc.), concave (e.g., wherein the face of the fish faces a corner, a groove, a conical interior, etc.), and/or otherwise shaped. In an example shown in FIG. 17A, the stopper can include a face mask 226, in which the face of the fish 11 is compressed into a contoured hollow. In an example shown in FIG. 17B, the stopper can include a tapering element 227 configured to taper the sheet of restraining material (e.g., so that the fish cannot move in a direction parallel to the rollers). The tapering element can include two sides and/or two components (e.g., a forked component with two forks, two parallel bars, parallel dowels, parallel rollers, a component with a slit that defines the two sides, etc.) that compress one or more sheets of the restraining material between the two sides and/or two components.

The set of actuators 230 can function to deploy the restraining material, manipulator, and/or other components of the fish fixturing subsystem. The set of actuators can be communicatively coupled to the control subsystem 430. In examples, set of actuators can include any or all of: mechanical actuators, electrical actuators, electromechanical actuators, pneumatic actuators, and/or other suitable actuators.

Figure 9:
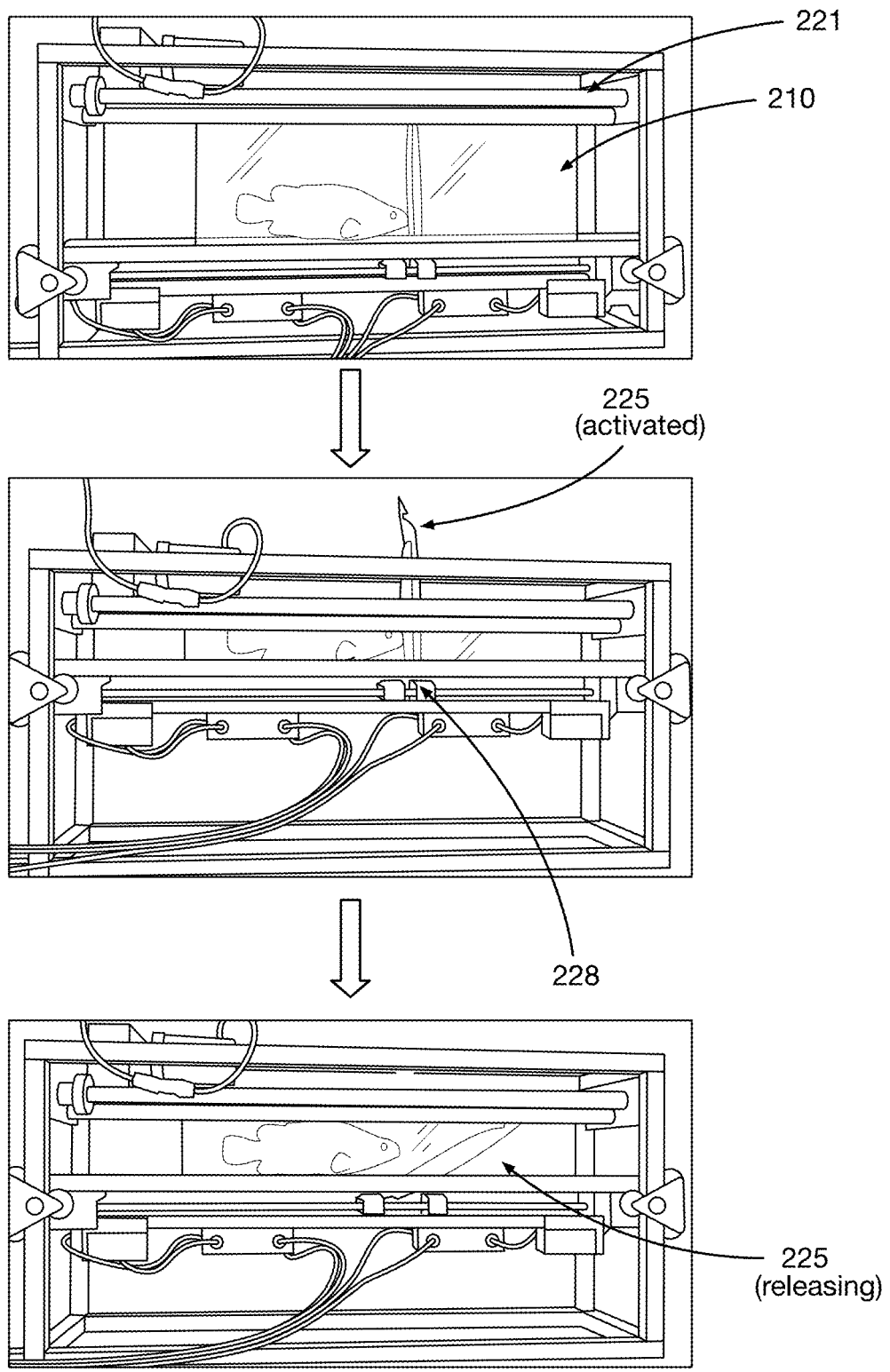
FIG. 9 is an illustrative representation of a variant of live fish fixturing.
Figure 15A:
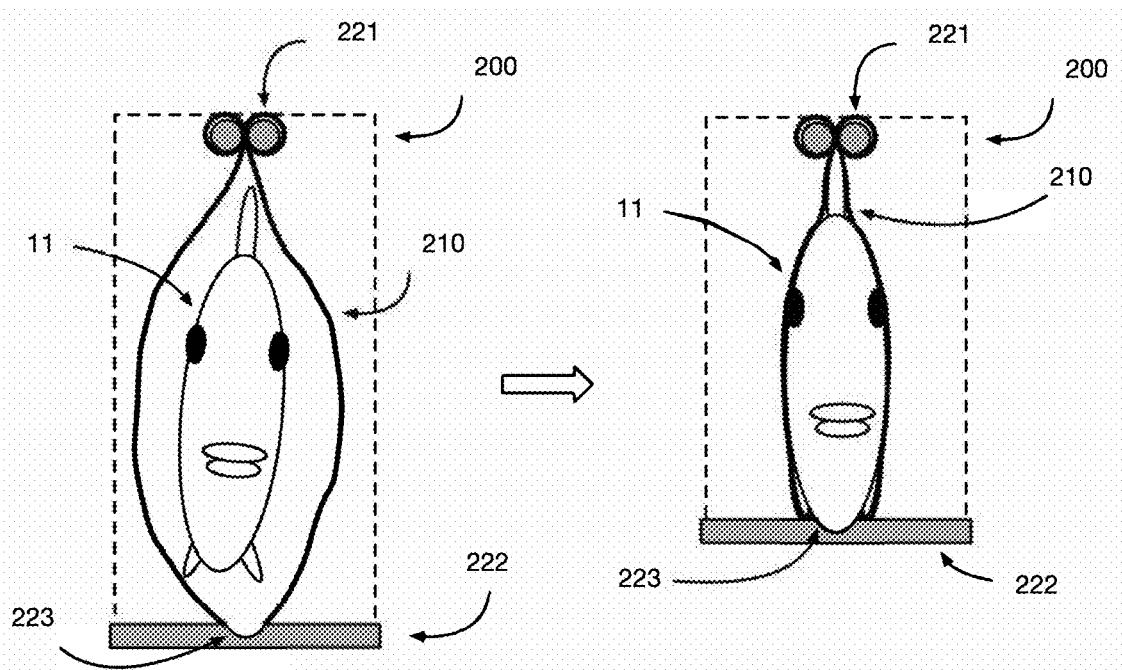
FIGS. 15A and 15B are illustrative representations of variants of a fish fixturing subsystem.
Figure 15B:
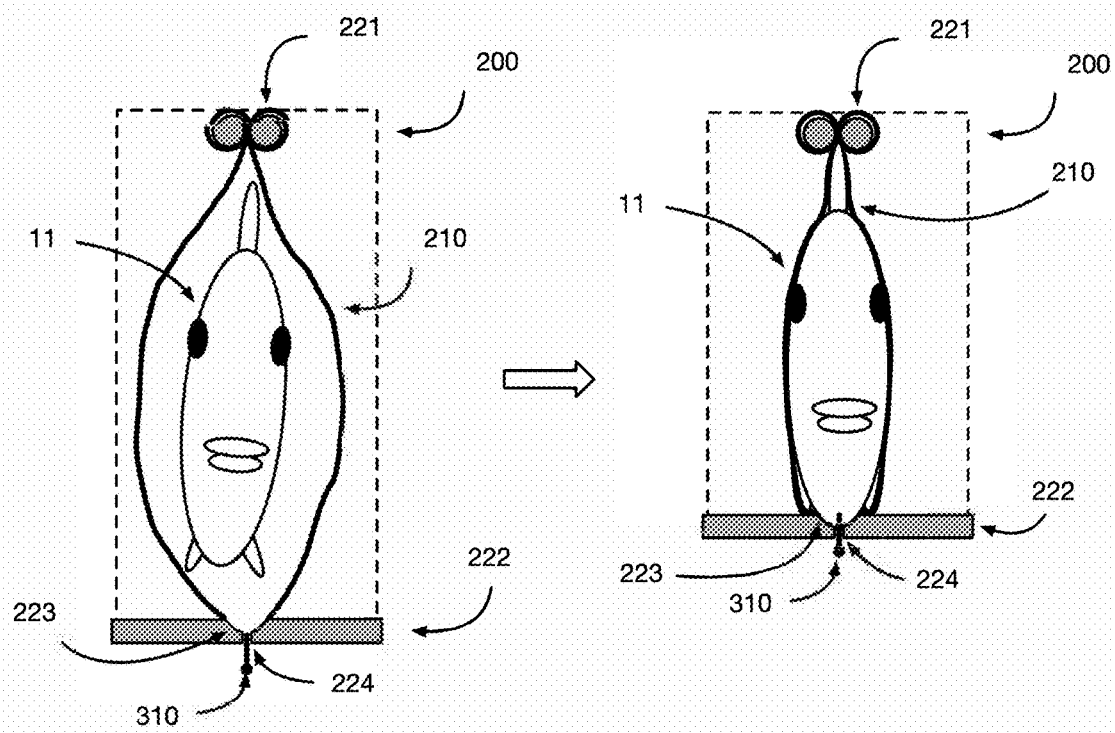

In a first variant (e.g., pictured in FIG. 15A), the fish fixturing subsystem can include two rollers, two sheets of restraining material (e.g., vinyl sheet), and a support 222 on which the fish can rest. Preferably, the sheets are clear, but can alternatively be opaque, semi-transparent (e.g., clouded), or any combination. The rollers can be arranged respectively parallel to one another, and each can be coupled to one sheet of restraining material at a first end of the respective sheet of restraining material such that when the roller turns, it rolls up or unrolls the respective sheet of restraining material. A second end of each sheet of restraining material can be coupled to the base. In a first specific example, the support 222 includes a groove 223 (e.g., a u-groove, a v-groove, etc.), the long axis of the fish is aligned with the groove, and the two sheets of restraining material are attached on either side of the groove (e.g., pictured in FIG. 15A). In a second specific example (e.g., pictured in FIG. 15B), additional or alternative to the first, the support 222 includes a set of one or more holes, and a tool 310 (e.g., a cutting tool) can be deployed by the control subsystem 430 to extend upwards and pierce the fish through the base. The inventors have discovered the unexpected result that when the two rollers are rapidly deployed to roll up the two sheets of material in unison (e.g., in <1 second, <0.5 seconds, <0.2 seconds, <2 seconds, <5 seconds, etc.), even if the fish enters the fish fixturing subsystem out of alignment and continues to thrash until fully restrained, the fish fixturing subsystem is self-centering, and the fish is wound up symmetrically aligned between the two sheets. In a third specific example (e.g., pictured in FIG. 9), additional or alternative to either or both of the first two specific examples, fish fixturing subsystem can include a bumper 225. Optionally, the bumper is automatically actuated by a fish sliding over a trigger as it enters the fish fixturing subsystem, and after processing is complete (e.g., euthanasia, exsanguination, etc.), a release mechanism can be actuated (e.g., as shown in the bottom of FIG. 9) to release the fish by rotating about a pivot point 228.

In a second variant (e.g., pictured in FIG. 8E), the fish fixturing subsystem can include two rollers, and one continuous sheet of restraining material (e.g., vinyl sheet), which can restrain the fish and optionally further support the fish (e.g., wherein the fish hangs from the rollers by the sheet of restraining material. Two opposing edges of the continuous sheet of restraining material can be coupled to and roll around the two rollers. In examples, the second variant can similarly wind up the two rollers in unison to center the fish within two opposing sides of the continuous sheet. In examples, supporting the fish with a single continuous sheet of restraining material can prevent bruising of the fish when the fish is large (e.g., >10 lbs, >25 lbs, >50 lbs, etc.) and would otherwise be too heavy to sit on a base without bruising.

Figure 5A:
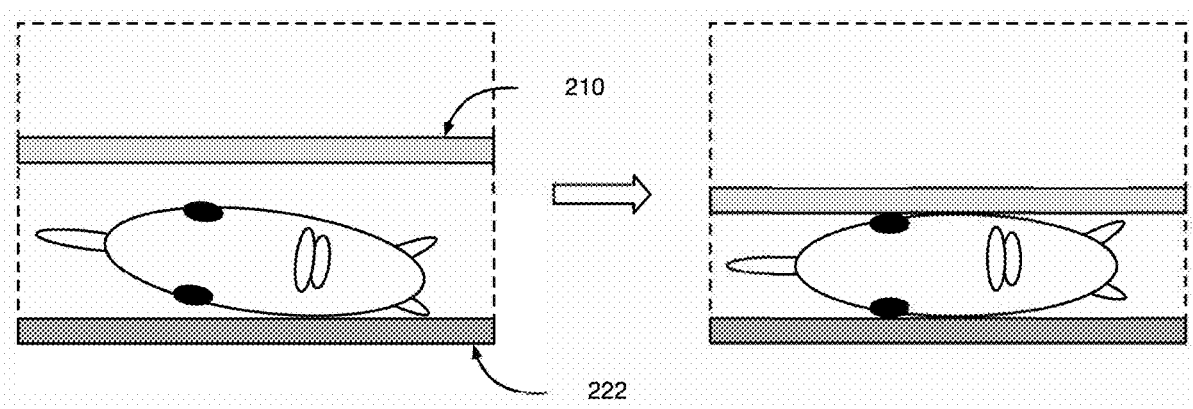
FIGS. 5A and 5B are illustrative representations of variants of live fish fixturing orientations.
Figure 5B:
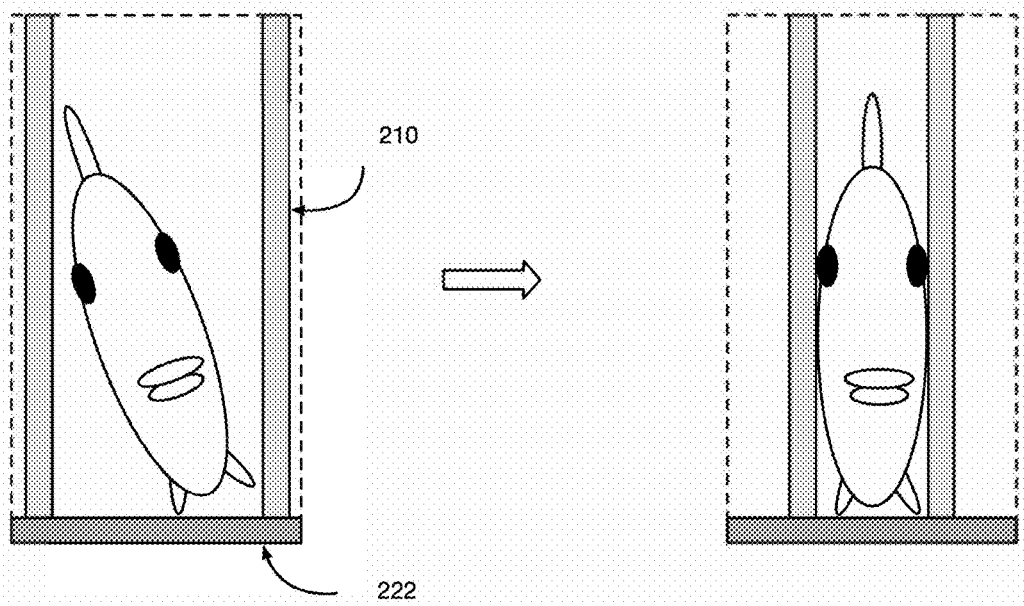

In a third variant, the fish fixturing subsystem can include a restraining material that is clear and inflexible (e.g., rigid). In examples, the restraining material can include one or more members (e.g., sheets, contoured members such as a bowl-shape, etc.) that can translate and/or rotate when actuated to compress the fish. The fish can be compressed: between two of the members, between one of the members and another surface (e.g., a support 222, a wall, etc.), and/or otherwise compressed. The fish can be compressed: by members on either side of the fish, by members on the top and the bottom of the fish (e.g., in a dorsal-ventral direction), by members in front of and behind the fish, and/or otherwise compressed. In a first specific example, the fish is compressed (e.g., on its side) against a support 222 (e.g., a base plate with holes through which a set of cutters can protrude) by a clear plastic or glass plate, so that the fish can be imaged through the clear plastic or glass plate. In a second specific example, the fish fixturing subsystem includes a tank (e.g., filled with water). The walls of the tank (e.g., the member) can translate along a long axis to compress the fish (e.g., examples shown in FIGS. 5A and 5B). Optionally, one or more of the walls has holes to allow water to release as the walls close.

In a fourth variant, (e.g., example shown in FIG. 8A), the fish fixturing subsystem includes one or more grippers (equivalently referred to herein as grips or fingers). The grippers can deploy by rotating into a closed position, or by translating into a closed position. The grippers can be made of a flexible material, a semi-flexible material, or a rigid material. In an example, mechanism includes two set of rotating grippers with multiple fingers on each gripper. The grippers are positioned such that the fingers interlace around the fish when in a closed position. The grippers can be concave along an interior surface, flat along the interior surface, and/or otherwise configured. Optionally, the grippers can be made of and/or supplemented with a high friction and/or abrasive material to increase friction between the grippers and the fish (e.g., example shown in FIG. 8C).

In a fifth variant (e.g., example shown in FIG. 8B), the fish fixturing subsystem includes one or more straps. The straps can be oriented vertically (e.g., to entrap the fish sides), laterally (e.g., to engage the fish top and bottom), and/or otherwise arranged. In an example, the straps are tightened (e.g., by pulling the straps, by rotating a rod to which the straps are affixed, etc.) over the fish to compress it underneath against a base plate.

In a sixth variant (e.g., example shown in FIG. 8D), the fish fixturing subsystem includes one or more inflatable sacs (e.g., air bladders) positioned around the workspace and configured to inflate around the fish, and a pump to inflate the sacs and compress the fish.

However, the fish fixturing subsystem can be otherwise configured, and/or include any other suitable components.

3.4 Tooling Subsystem 300

The system can include a tooling subsystem 300, which can function to perform robotic fish processing operations (e.g., in an automated or semi-automated fashion). The tooling subsystem 300 can receive a set of control signals (e.g., referred to equivalently herein as commands) from the control subsystem, which can include tool trajectories, parameters, and/or any other suitable commands.

The tooling subsystem can execute a set of tooling operations based on the set of control signals received. Preferably, the tooling operations include at least one of: euthanasia of the fish, exsanguination of the fish, or both. However, the tooling operations can additionally or alternatively include: post-processing (e.g., filleting, skinning, descaling, removing fins, removing spikes, cleaning, bleeding, deboning, packaging, etc.), controlling other system elements besides the tools (e.g., fixtures, sensors, transportation elements, etc.), and/or otherwise processing the fish.

Preferably, upon receiving the set of control signals, the tooling subsystem executes the set of control signals, but can additionally or alternatively trigger an action such as: an alarm (e.g., sound an alarm, send an alarm notification to an endpoint such as a supervisor, etc.), a safety action (e.g., power off the system, cease movement of one or more system elements, eject the contents of the fish processing subsystem 102, flush out the fish processing subsystem 102, etc.), a request for confirmation (e.g., by a manual operator) to proceed with the intended control signal, and/or any other suitable action. Optionally, the action may be triggered if: the analysis subsystem determines that a non-fish object is detected within the system (e.g., a human hand), the analysis subsystem determines a system malfunction (e.g., a need for maintenance), and/or under any other suitable conditions.

The tooling subsystem 300 can include a set of tools 310 (e.g., referred to equivalently herein as cutting tools), including any number and/or combination of cutting tools; their respective actuators; position adjustment mechanisms (e.g., gantry, gimbal, screw, etc.); locating supports (e.g., locating surfaces) 301; and/or any other suitable components. In variants, tools can be used as euthanasia tools (e.g., kill tools, examples shown in FIGS. 13A-13E, etc.), exsanguination tools, post-processing tools, and/or for any other suitable purpose. In variants, cutting tools can refer to any tools that penetrate (e.g., punctures, cores, splits, separates, linearly cuts, drills through, etc.) any surface of the fish (e.g., skin, gills, lungs, bones, brain, tissues, etc.). In variants, a plurality of tools and/or toolheads can be simultaneously actuated (e.g., example shown in FIGS. 13A and 13C).

Figure 12:
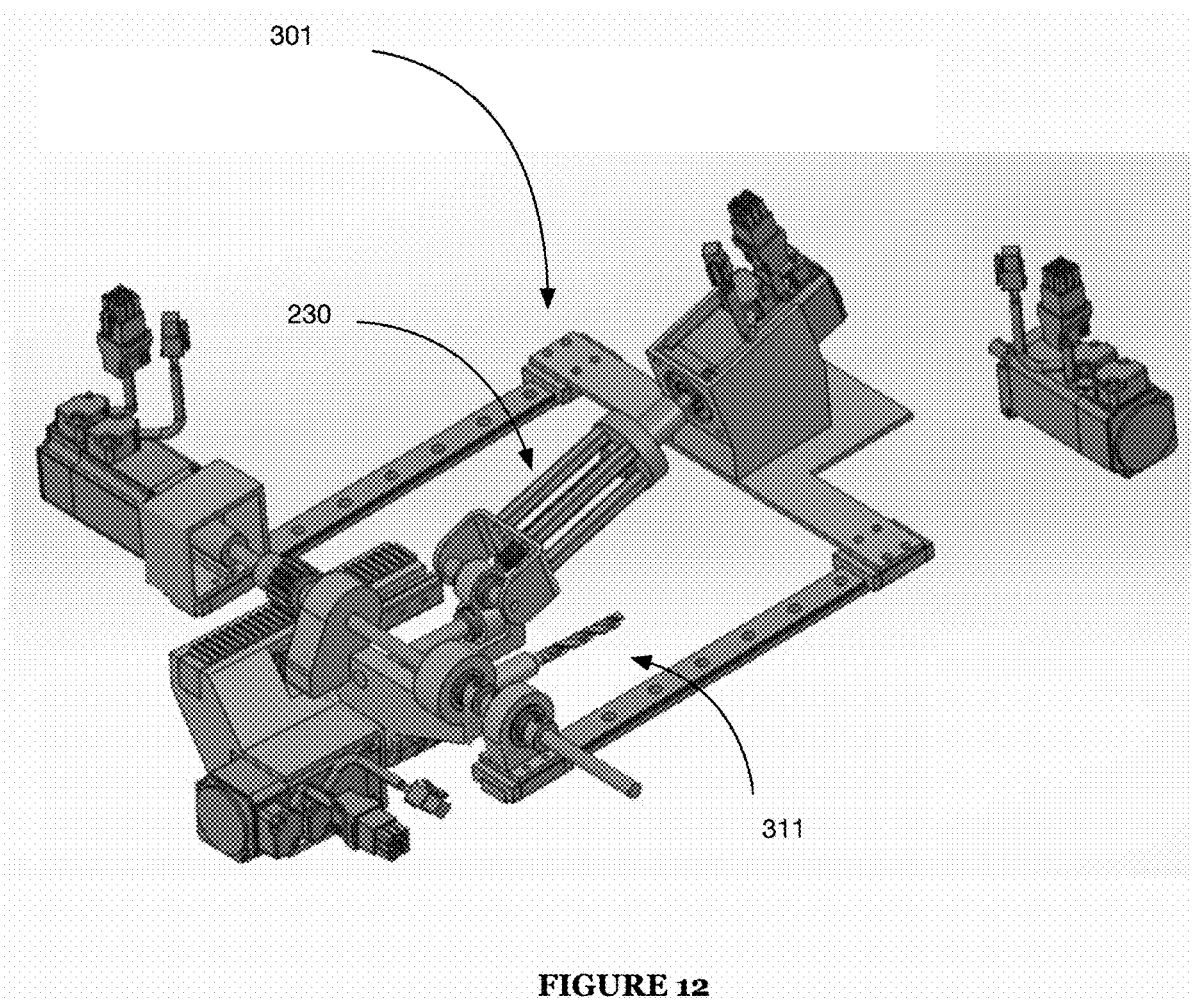
FIG. 12 is an illustrative representation of a variant of a drill kill mechanism.

In variants, the set of tools 310 can include: a drill (e.g., examples shown in FIG. 12 and FIGS. 13D-13E), a blade, a saw, any other cutting tool, a spike, a blade, a bludgeon, a spear, pressurized fluid (e.g., a water jet, an air jet, etc.), a laser, an electrode set, a fishing priest, a bat (e.g., a fishing bat), a hot wire, and/or any other suitable tool. Preferably, different tools are used for performing different tooling operations (e.g., wherein a drill is used for euthanasia and a saw is used for exsanguination), however, the same tool can optionally be used for multiple tooling operations.

Preferably, the set of tools 310 includes a drilling subsystem 311 (e.g., for killing the fish), which in preferably used for euthanasia, but can additionally or alternatively be used for any other fish processing steps. The inventors have discovered that euthanizing the fish by drilling through the fish brain is particularly advantageous because the drill sucks in the brain as the bit penetrates the brain, thereby destroying the brain with a greater tolerance for error than a non-rotating tool (which is particularly important for fish, which often have a relatively small brain and large brain cavity, making the brain challenging to hit accurately).

The drilling subsystem can include a drill with a drill bit and a chuck. However, the set of tools 310 can include any other tools. Examples of drill bits can include: a cannulated drill, a spur point bit, any drill bits designed to reduce slippage (e.g., brad point drill bits, split point drill bits, auger drill bits, masonry drill bits with carbide tips, diamond drill bits, step drill bits, and countersink drill bits, etc.), drill bits with fangs and/or spikes, fluted drill bits (e.g., single flute, double flute, triple flute, 4 flute, etc.), and/or any other suitable drill. The inventors have discovered that euthanasia by brain using a drill with flutes is further particularly advantageous as the flutes remove material (e.g., brain tissue) as the bit penetrates the brain. The inventors have further discovered that a Bradley point drill (and/or any other drill or any other similar drill designed to reduce slippage can provide the benefit of reducing a risk of the drill slipping on the slippery and slimy fish head, thereby more accurately and quickly euthanizing the fish and reducing fish stress.

The set of tools 310 can include a cutting subsystem 312, which can include a blade and/or a saw. The cutting subsystem is preferably used to perform exsanguination, but can additionally or alternatively be used for any other fish processing steps (e.g., euthanasia, filleting, etc.). Examples of blades can include: circular saw blades, band saw blades, jigsaw blades, reciprocating saw blades, hacksaw blades, utility knife blades, planer blades, miter saw blades, scroll saw blades, concrete saw blades, rotating blades, scallop blades, dado blades, and/or any other suitable blades. Examples of saws can include: oscillating saws, meat saws, circular saws, plunge cut saws, band saws, reciprocating saws, 2-blade reciprocating saw, backsaws, coping saws, jigsaws, hacksaws, panel saws, flush-cut saws, tenon saws, fret saws, crosscut saws, rip saws, bow saws, chainsaws, miter saws, scroll saws, table saws, and/or any other suitable saws. In a first specific example, an oscillating saw and/or a reciprocating saw (e.g., a 2 blade reciprocating saw) can provide the unique benefit for cutting fish of having a relatively large mechanical advantage for cutting in a very small form factor, which can enable the overall system for fish processing to be produced in a smaller unit (e.g. a portable unit, a unit that can be installed on a vessel, etc.). In a second specific example, a circular saw can be particularly effective for cutting a fish that is fixtured against a base. In a third specific example, a plunge cut saw can further be effective for adapting cuts of a fish that is fixtured against a base to the fish's unique geometry (e.g., because the cut can begin from an arbitrary starting point).

Preferably, the tooling subsystem 300 includes one set of tools that are used to consecutively process (e.g., euthanize, exsanguinate, etc.) multiple fish of varying attributes (e.g. species, size, etc.), without needing to change tools between processing consecutive fish of varying attributes. Processing multiple fish consecutively of a variety of attributes without tool changes can confer the benefits of: increased throughput (e.g., by eliminating a time required for tool change), reduced system complexity, and/or other suitable benefits. Additionally or alternatively, two or more fish of different types (e.g., of species, size, and/or any other attributes) can be processed by different sets of tools, wherein tools can be selected (e.g., by the analysis subsystem 400) and swapped out (e.g., by the control subsystem) between consecutively processed fish based on one or more fish attributes, which can confer the benefit of minimizing the size of an incision made by the tools (e.g., wherein the size of the incision is only as large as required by an appropriate factor of safety for a fish with a particular set of attributes). However, the system can optionally include multiple sets of tools (e.g., of varying tool parameters such as types, sizes, etc.; backup tools; etc.) and can optionally further include multiple sets of tool holders. In variants, tools can be changed: as determined based on one or more fish attributes (e.g., species, size, etc.), when a tool fails (e.g., due to wear, fracture, warpage, etc.), in response to a request (e.g., an input from an operator), and/or at any other suitable time. Optionally, a tool (e.g., tool type, tool size, etc.) and/or a set of tools can be specific to one or more fish attributes. However, tool can be generic across all fish and/or across one or more species of fish.

The tools can be actuated automatically, pneumatically (e.g., using a spring, a piston, a capacitor, etc.), mechanically, electrically, manually, and/or otherwise actuated. While the tooling subsystem can include a singular tool, preferably the tooling system includes multiple tools. In variants with multiple tools, the tools can be independently actuated (e.g., to deploy simultaneously, to deploy consecutively, etc.), simultaneously actuated, and/or otherwise actuated. In a preferred variant, the tooling subsystem includes at least two tools (e.g., for performing euthanasia and exsanguination). In an example, a first tool (e.g., a euthanasia tool such as a drill) is located relatively proximal to the position of the fish head upon fish entry into the system, while a second tool is located relatively proximal to the gills (e.g., near the underbelly), the tail, and/or any other suitable location of the fish upon fish entry into the system.

In a first variant, the tooling subsystem includes a drill and one or more additional cutting tools. Each of the drill or the cutting tools can be located at a fixed position or movable. The cutting tools are preferably deployed after deployment of the drill (e.g., after brain death, after brain death is confirmed, etc.), but can additionally or alternatively be deployed prior to deployment of the drill, concurrently with deployment of the drill, and/or at any other suitable time. In a first example, the tooling subsystem includes a drill and one cutting tool (e.g., a stationary cutting tool, a moveable cutting tool, etc.) that makes one cut at one target anatomical location of the fish. In a second example, the tooling subsystem includes a drill and one moveable cutting tool that makes multiple cuts at multiple target anatomical locations of the fish. In a third example, the tooling subsystem includes a drill and two cutting tools (e.g., stationary cutting tools, moveable cutting tools, etc.) that each make one cut at one target anatomical location of the fish. Optionally, the tooling subsystem can include further tools to perform further post-processing steps.

In a second variant, the tooling subsystem includes a first tool configured for euthanasia (e.g., a spike, a set of spikes, a pneumatic bat, etc.) and a second set of tools (e.g., cutting elements) configured for exsanguination. Optionally, the tooling subsystem can include further tools to perform further post-processing steps.

In a third variant, the tooling subsystem includes a jet cutter that can cut the fish with pressurized water, pressurized air, and/or any other pressurized fluid. In variants, the jet cutter can cut all the way through the fish (e.g., pierce from an entry point through the fish body to an exit point; fully sever a body part such as the head, tail, etc.; etc.), or through only a portion of the fish. In variants (e.g., when the cut does not cut all the way through the fish from an entry side to an exit side) the tooling subsystem includes multiple jet cutters configured to cut the fish in two or more locations simultaneously to prevent a pressure buildup of the pressurized fluid within the fish, which could cause deformation of the fish or other damage to the meat. Optionally, the tooling subsystem can include further tools to perform further post-processing steps.

Optionally, one or more of the tools can extend through one or more holes and/or gaps of the fish fixturing subsystem (e.g., a hole in the support 222, a gap between fingers of a claw fixturing variant, a gap between two sheets of restraining material, etc.). Additionally or alternatively, the fish fixturing subsystem can work hold the fish such that a portion of the fish protrudes beyond the fixturing elements (e.g., restraining material, manipulators, etc.), so that the tool does not need to directly bypass the fixturing elements.

Any of the tools can have any number of degrees of freedom (e.g., translational, rotational, etc.), which can function to position the tool to be able to cut the fish an optimal point of entry and/or angle of entry, and/or otherwise function. To produce the degrees of freedom, the tooling subsystem can include: a parallel linkage mechanism, a set of rails and sliders, serial linkage mechanisms, rotary joints and/or actuators, linear joints and/or actuators, spherical mechanisms, articulated robots, cartesian robots, polar robots, jointed-arm robots, cylindrical robots, SCARA robots, hybrid mechanisms, and/or any other suitable elements supporting the tools.

In a first variant, any of the tools can have a fixed position, wherein the tool is actuated by rotating, vibrating, and/or otherwise moving in place. In this variant, the fish fixturing subsystem can move the fish towards the tool as the tool is actuated to initiate the tooling operation. In an example, at least one of a euthanasia mechanism or an exsanguination mechanism can be static.

Figure 11A:
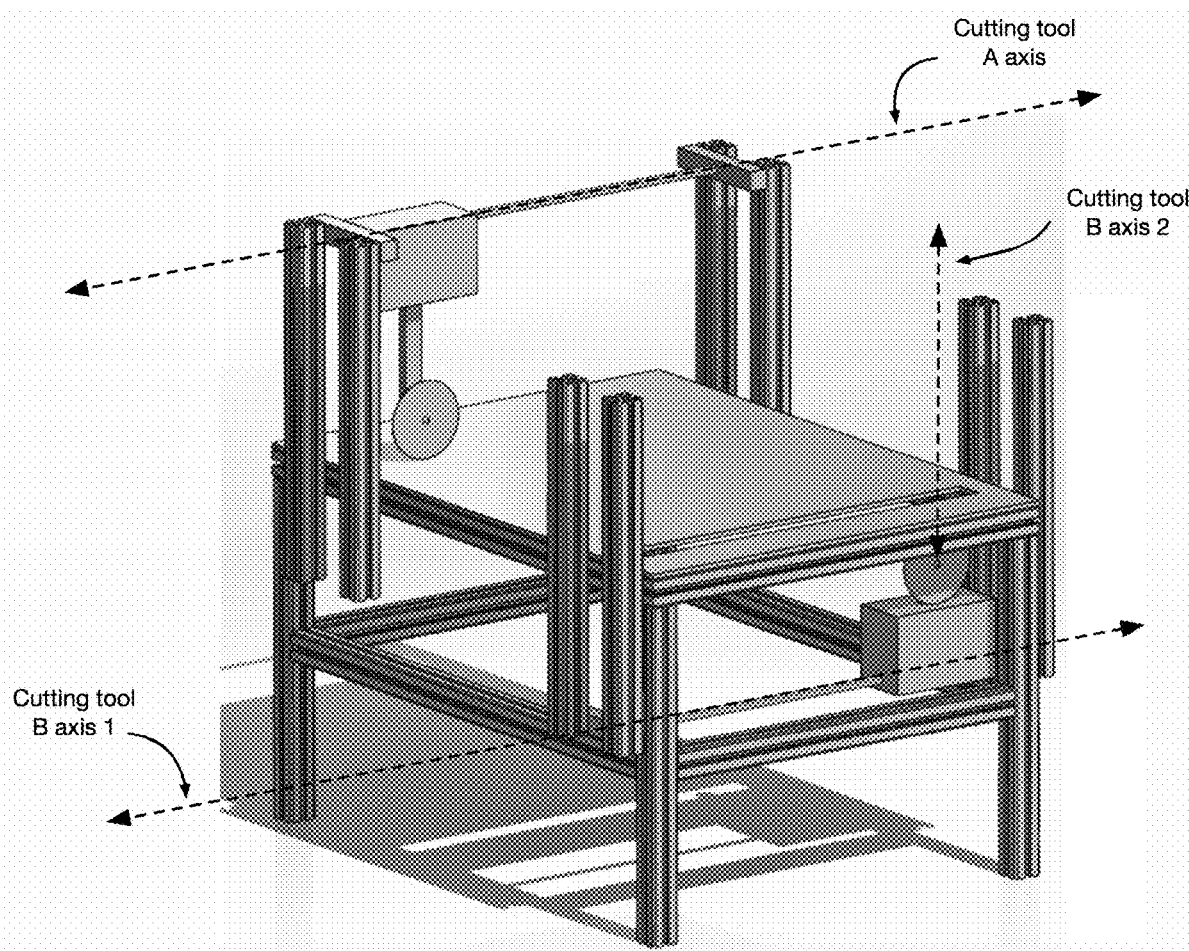
FIGS. 11A and 11B are an illustrative representation of a variant of an exsanguination station and the variant of the exsanguination station in use, respectively.

In a second variant, any of the tools can have a singular translational degree of freedom (e.g., be actuatable vertically, laterally, etc.), and optionally one or more rotational degrees of freedom. In this variant, the fish fixturing subsystem can be used to align the fish with a line of action of the tool so that when actuated along its singular translational degree of freedom, the tool will cut the fish at a desired point of entry. Additionally or alternatively, the control subsystem can use the translational degree of freedom to position the tool, and use the fish fixturing system to translate the fish towards the tool. Optionally, the angle of entry can be further adjusted by configuring the tool to have an additional rotational degree of freedom. In a first example, the tool can include a drill that rotates about the long axis of the drill, and translates along the same long axis (e.g. to pierce the brain of the fish). In a second example, the tool can include a saw (e.g., oscillating saw, circular saw, etc.) that translates in a single direction (e.g., up through a support to pierce the underbelly of the fish) to intersect with the fish. In a third example, the tool can include a spike and/or any other suitable tool. In a specific example, the set of tools includes a single axis cutting tool (e.g., example shown in FIG. 11A). In this specific example, the fixture preferably restrains the fish such that a key fish component (e.g., the gills, the tail, etc.) lies in line with the axis of the cutting tool. The tool can translate along its single axis to lacerate the fish, and optionally also move in an additional modality (e.g., rotate, vibrate, etc.) suited to the tool type (e.g., circular saw, band saw, etc.). The cutting tool can translate along its line of action to a specified depth of cut (e.g., as determined by the CV system, a hard-coded depth, etc.). If the cutting tool is used to cut multiple features (e.g., tail and gills), the fish can optionally be moved (e.g., wherein the fixture holding the fish is moved; wherein the fixture holding the fish is de-activated, the fish is moved, and the fixture is re-activated; etc.) between cuts.

In a third variant, any of the tools can have at least two translational degrees of freedom (e.g., for positioning along a first translational DOF and actuation along the second translational DOF; for positioning along both translational DOFs, wherein the fish fixturing subsystem moves the fish towards the tool; etc.), and can be constrained to move along one at a time, or freely along both simultaneously. An additional translational degree of freedom can enable the tooling subsystem to position the tool at a more optimal point of entry. In a first example of the third variant the set of tools can include a drill. In examples, the drill can translate along the long axis of the drill (e.g., to cut the fish) and along an additional line (e.g., a line parallel to the sagittal plane of the fish) offset from the long axis of the drill (e.g., to position the drill prior to the cut). A drill with the capability to reposition itself prior to a cut is particularly beneficial when drilling a fish because the exterior surface of fish skin is often slippery and conducive to slippage, so the more degrees of freedom the drill has, the more optimally (e.g., incoming at a substantially normal angle relative to the surface of the fish at the point of entry) the drill can pierce the fish. In a second example of the third variant, the set of tools can include a dual axis cutting tool (e.g., example shown in FIG. 11A). The tool can optionally move along one or more tool positioning axes (e.g., to position its cutting line of action in line with a key feature), and move along a single axis (e.g., as in the first variant) or multiple axes (e.g., wherein the cut traces a 2D incision through the fish) to lacerate the fish. In a first example, the fish is fixtured such that the tool positioning axis is substantially parallel to the spine of the fish and perpendicular the sagittal plane of the fish, and the cutting line of action is substantially perpendicular to the spine of the fish (e.g., wherein the cutting tool intersects a lateral side of the fish tail). In a second example, the fish is fixtured such that the tool positioning axis and the cutting line of action are both substantially perpendicular to the long axis of the fish. In a specific example, the cutting tool is constrained to move vertically through and laterally relative to the base of the exsanguination station. A baseplate of the exsanguination station has a hole that the cutting tool can fit through, wherein the fish is positioned with its gills over the hole (e.g., as determined by the CV system), and the cutting tool positions itself to make the cut proximal to the underbelly of the fish depending on which side the fish is lying on (e.g., as determined by the CV system). The cutting tool moves along a first axis (e.g., laterally) and optionally a second axis (e.g., vertically) for positioning, and then along a cutting line of action (e.g., upward or laterally relative to the base plate) through the gills.

In a fourth variant, any of the tools can have one or more (e.g., two, three, etc.) rotational degrees of freedom, additional or alternative to the translational degrees of freedom. In a first set of examples the tool includes a drill, and the rotational degrees of freedom can include a rotation around the long axis of the drill, and one or more rotations at an angle relative to the long axis of the drill. In a first set of examples the tool includes a cutting tool (e.g., a saw, blade, jet, etc.). Optionally the angle of rotation can include an angle of actuation, wherein rather than or in addition to translating to cut the fish, the cutting tool moves in an arc motion relative to the exterior of the fish that cuts the fish. Optionally the angle of rotation can include an angle of entry, wherein the cut enters the fish at a specified angle (e.g., an optimal angle as determined by the analysis subsystem).

In a fifth variant, the tools additionally or alternatively include active bleeding elements, which function to push the blood through the blood vessels of the fish after laceration. Active bleeding elements can include tubing and a pressurized fluid (e.g., pressurized saline solution, pressurized water, pressurized air, etc.) and/or any other active bleeding element. Tubing (e.g., a pipe, a hose, etc.) can move along one or more axes and be positioned proximal to a major blood vessel after a laceration has been made to pump the pressurized fluid through the fish. Additionally or alternatively, the fish can be placed (e.g., by opening a chute and allowing the fish to fall) into a holding chamber (e.g., a water tank) to be passively bled after one or more tooling (e.g., cutting) operations are performed.

All of the above variants are combinable (e.g., and of the first three variants with the fourth variant), as the system can include any quantity and combination of tools.

However, the tooling subsystem can be otherwise configured, and/or include any other suitable components.

3.5 Analysis Subsystem 400

The system can include and/or interface with analysis subsystem 400, which can function to determine information about the fish and control operation of the fish processing device. In variants, the analysis subsystem can: perform verifications (e.g., ensure that only fish that meet a set of criteria are processed by the system, validate the steps have been properly executed (e.g., confirm euthanasia/brain death, confirm restraints holding fish properly before performing a step, etc.), etc.), collect data on the fish (e.g., species, size, quality metrics, time, etc.), determine tooling parameters, send control instructions to the tooling subsystem, and/or otherwise function. In variants, the analysis subsystem can include any of the systems, methodologies, or components described in U.S. application Ser. No. 18/582,481, filed 20 Feb. 2024, or in U.S. application Ser. No. 17/984,084, filed 9 Nov. 2022, each of which is included herein in its entirety by this reference.

The analysis subsystem can include and/or interface with one or more: measurement systems 410, processing modules 420, control subsystems 430, communications systems 440, and/or any other suitable components.

Figure 10:
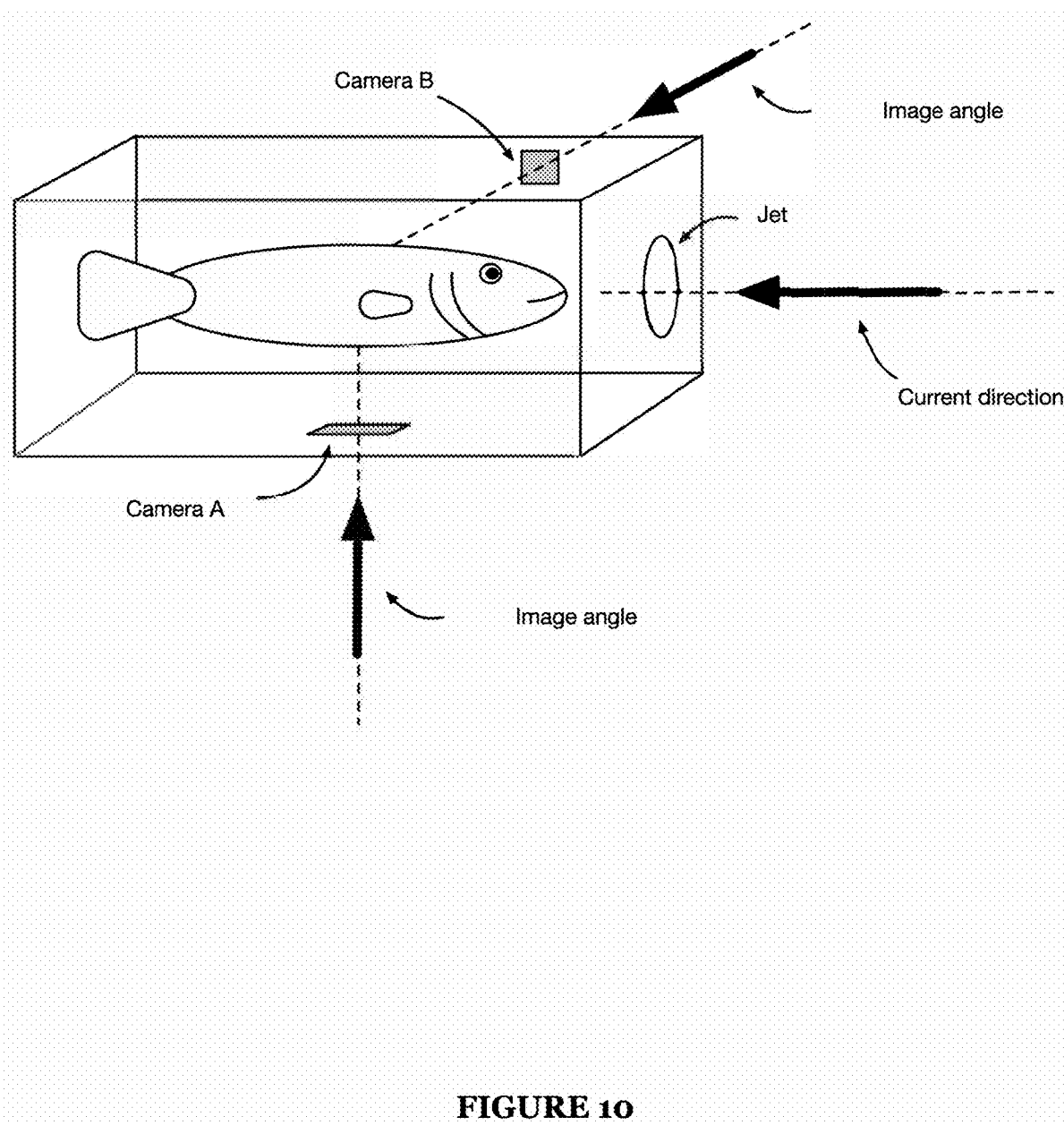
FIG. 10 is an illustrative representation of a variant of an intake station.
Figure 14:
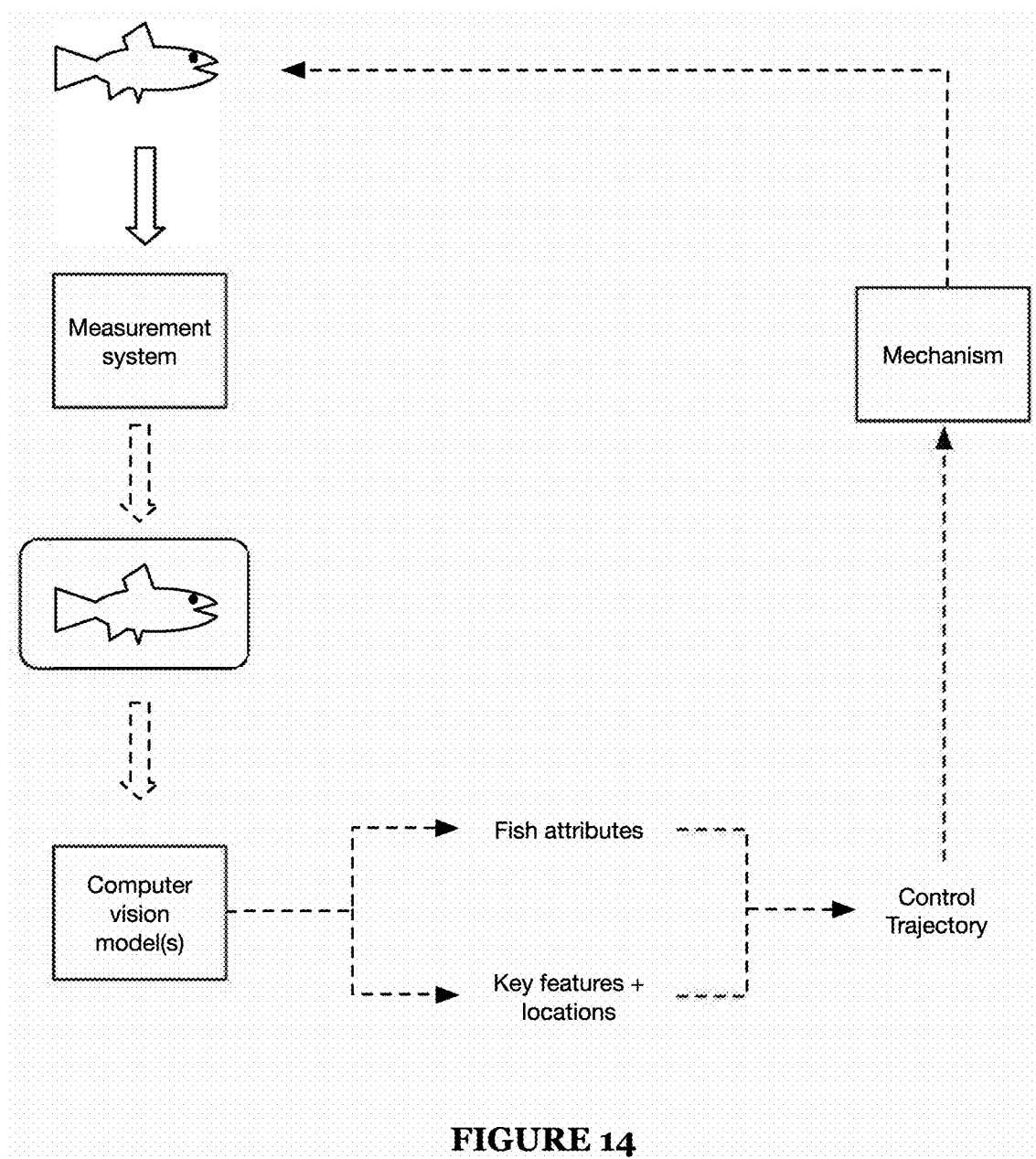
FIG. 14 is an illustrative example of a variant of determining a control trajectory using the measurement system.

The measurement system 410 can include one or more sensors, which function to sample measurements of the fish. Types of sensors can include: cameras, tactile sensors (e.g., embedded in a strap), scales, force sensors, displacement sensors, tensiometers, pressure sensors, vibration sensors, current sensors, voltage sensors, ECG, and/or any other sensors. Each station (e.g., referred to equivalently herein as a fish processing subsystem 102) can include one or more sensors of the same and/or different type. In a preferred embodiment, the measurement system 410 includes a set of one or more cameras arranged to image the fish through the fixturing subsystem (e.g., through a transparent restraining material of the fixturing subsystem). However, the measurement system 410 can include any other sensors and/or any other configuration thereof. Sensors can be arranged along any of the sides of the station (e.g., front, rear, top, bottom, left, right, etc.), at the intersection of any sides of the station, along a contour of the station (e.g., wherein the station has a contoured edge and/or side), at any angle relative to the station, within the station, outside of the station, and/or otherwise collocated with the station. For example, cameras can be arranged along a side of the respective stations to capture the sorting image and/or euthanasia image, and be arranged along the bottom and/or top of the respective station to capture the exsanguination image (e.g., examples shown in FIG. 10). However, the sensors can be otherwise arranged. In examples, each mechanism and/or station can be controlled based on sensor measurements. wherein the sensor measurements can be used to determine fish attributes (e.g. location, species, size, weight, etc.), features (e.g., key points), the control trajectories, and/or other information (e.g., using one or more machine learning models, computer vision models, and/or any other suitable model; example shown in FIG. 14; etc.).

The processing module 420 can function to determine a set of information based on the measurements sampled by the measurement system 410. The set of information can include: fish attributes (e.g., species, size, quality metrics, state, etc.), locations of anatomical features of interest, tool parameters, and/or any other suitable information. The processing module 420 can include one or more models, which can function to: determine fish attributes (e.g. a fish attribute model), determine locations of anatomical features of interest (e.g., a fish component model), determine optimal tool trajectories and/or other parameters (e.g., trajectory models), confirm execution of a method step (e.g., confirm euthanasia), and/or otherwise function. At least a subset of the models can be specific to at least one of a fish species, fish size parameter (e.g., length, grade, weight, etc.), season, operating context, any other attribute, and/or any other parameter. The specific model can optionally be retrieved based on the respective combination of parameters (e.g., species, size parameter, attributes, etc.). However, any of the models can be: generic (e.g., applied across all fish species, seasons, sizes, etc.), applied across a subset of possible parameters, and/or otherwise applied.

The processing module 420 can optionally include a control subsystem 430, which can function to generate and send control signals to the tooling subsystem. The control subsystem can generate control signals (e.g., plan a tool trajectory) based on measurements sampled by the measurement system 410. Preferably, the processing module 420 automatically determines the trajectories and/or other operational parameters (e.g., tool parameters) based on the measurements using a set of models (e.g., computer vision-based models, machine learning models, etc.); however, the trajectories and/or other operational parameters can additionally or alternatively be determined based on an input (e.g., an operator input), a set of predefined parameters retrieved from a database (e.g., based on a current machine setting, based on a fish attribute/size/any other parameters, etc.), and/or otherwise be determined.

The communications systems 440 can function to send information between one or more systems elements, and/or between system elements and external systems. 440 can include: localization technologies (e.g., GPS, INS, RF, ECS, ECDIS, radar, AIS, GNSS, Depth Sounders and echo sounders, compass systems, lidar and sonar systems, etc.), satellite communication systems, WiFi, LTE, a data connection to a vessel and/or factory in which the system is installed, web platforms, databases, and/or any other suitable communications systems.

However, the analysis subsystem can be otherwise configured, and/or include any other suitable components.

3.6 Expulsion Subsystem 500

The system can optionally include an expulsion subsystem 500 (e.g., referred to equivalently herein as an "expulsion station"), which can function to remove the processed fish from the system. The fish can be expelled from the system: into a labeled container, into an unlabeled container, onto an ice bed, into a tank (e.g., of water, to further exsanguinate naturally via the cuts administered by the system, etc.), into an unspecified endpoint, and/or otherwise expelled. The fish can optionally be sorted in the expulsion station by its attributes (e.g., species, quality, size, etc.), and can optionally be expelled into a container with other fish sharing one or more attributes.

Any of the transportation subsystems described herein can be used to expel the fish. The expulsion station can include hosing to flush the fish out of the system (e.g., with water, with another type of liquid solution, etc.). The expulsion station can include a gate (and optionally a chute) to selectively drop the fish out of the system. The expulsion station can include a conveyor belt which can transport the fish to an undesignated endpoint (e.g., wherein the endpoint of the conveyor belt is the same for all fish), or take the fish to a specific endpoint (e.g., wherein the conveyor belt releases the fish at an endpoint it is sorted to).

However, the expulsion subsystem can be otherwise configured, and/or include any other suitable components.

4. Method

Figure 4A:
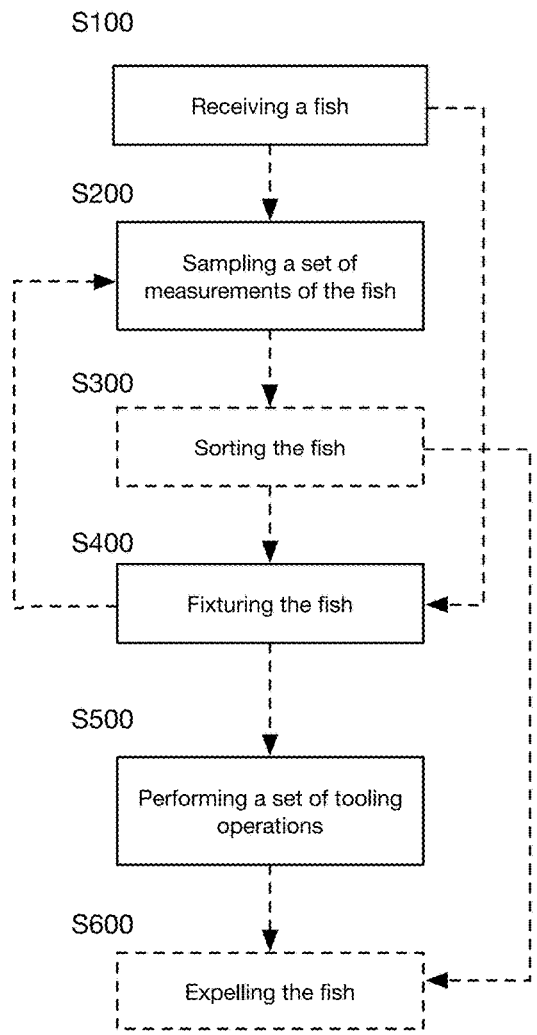
FIGS. 4A and 4B are schematic representations of variants of the method.

As shown in FIG. 4A, the method can include: receiving a fish, sampling a set of measurements of the fish S100, optionally sorting the fish S200, fixturing the fish S300, performing a set of tooling operations S400, optionally expelling the fish, and/or any other suitable operations. The method can function to rapidly and humanely euthanize a fish, to perform a set of processing steps (e.g., exsanguination) on a fish, and/or otherwise function.

However, the method can be otherwise performed.

4.2 Sampling a Set of Measurements of the Fish S100.

Sampling a set of measurements of the fish S100 can function to collect a set of information that can be used to: determine a set of fish attributes, sort the fish, fixture the fish, performing a set of tooling operations on the fish, track fish data, and/or determine any other suitable information about the fish.

In variants, the measurement system can be used to determine: receipt of the fish, when to activate the fixture, the final fixture position, successful fixturing, the exsanguination method (e.g., tool type, tool configuration, etc.), the exsanguination trajectory (e.g., via determining the locations of key features such as tail, gills, head, fins, stripe patterns, etc.), and/or otherwise used.

Sampling the set of measurements can include using any of the measurement systems 410 described herein. Measurements of the fish can be sampled: prior to receiving the fish, after receiving the fish, prior to restraining the fish, contemporaneously with restraining the fish, prior to performing one or more tooling operations, between subsequent tooling operations, after processing the fish (e.g., during a validation phase), and/or at any other suitable time.

However sampling a set of measurements of the fish can be otherwise performed.

4.3 Sorting the Fish S200.

The method can optionally include sorting the fish S200, which can function to determine whether the fish meets a set of processing requirements. In variants, the fish is sorted (e.g., through one of the gates of the corral subsystem) based on a determination of its attributes (e.g., size and species) by the analysis subsystem (e.g., by a trained model). Sorting the fish is generally performed after sampling a set of measurements of the fish S100, based on the measurement set.

In a first variant, the fish is sorted automatically using a vision-based system. In an example, a computer vision model classifies the fish based on a set of images collected by the measurement system, and the respective gate is selectively opened to allow fish egress.

In a second variant, the fish is sorted automatically using a vision-based system in conjunction with other sensor modalities. In an example, one or more models (e.g., machine learning, heuristics, etc.) determine the gate based on a set of images and other measurements (e.g., audio, force, etc.) collected by the measurement system.

In a third variant, the fish is sorted manually. In an example, the sorting mechanism include a binary input device (e.g., a button, a switch, etc.) that allows a human operator to input the gate selection. In a third variant, the sorting system geometry can passively sort the fish. For example, the sorting system inner diameter can progressively decrease with distance away from the opening, wherein only fish from a certain region of the sorting system (e.g., an upstream region) are retrieved for further processing.

However sorting the fish can be otherwise performed.

4.4 Fixturing the Fish S300.

Fixturing the fish S300 can function to automatically restrain the fish in a known location (e.g., so that humane, accurate, and rapid euthanasia can be performed). The fixture can be deployed automatically (e.g., by an automated fixturing sub-system), mechanically (e.g., triggered in response to an input force), electrically, manually (e.g., by a human operator), and/or otherwise triggered.

In variants, fixturing the fish can include actuating the fish fixturing mechanism automatically and/or manually. The fish fixturing mechanism can move with one or more degrees of freedom (e.g. translational, rotational, in 1D, in 2D, in 3D, etc.). In variants, the fixturing mechanism can move along one or more axes to restrain the fish, and optionally move along one or more axes to get into a position to restrain the fish. In an example, the measurement system is used to determine the fish size and the position of the fish in the station, and the fixture position is adjusted to align the fish with a desired tool path. In a de-activated state, the fixture is moved to a position that leaves an opening as wide or wider than the ingress.

In variants, fixturing the fish optionally includes restraining the fish at an angle relative to the ground, such that the fish is restrained by both a restraining material (e.g., the two transparent sheets of restraining material described herein) and a stopper (e.g., a bumper in front of the fish, relatively lower than the fish in the z direction).

In variants, fixturing the fish can include restraining the fish within a station such that the longitudinal axis of the fish is parallel to the base of the station (e.g., wherein the fish is fixtured to lie on its side, upright, etc.). Alternatively, the fish can be held in any other orientation relative to the base of the station. In a first example, the fish is fixtured vertically (e.g., with the sagittal plane substantially normal to the station bottom) for one or more cuts (e.g., euthanasia cut and exsanguination cut). In a second example, the fish is fixtured sideways (e.g., for an exsanguination cut) with the fish sagittal plane substantially parallel the station bottom (e.g., such that the fish is lying on its side on the work surface).

Preferably, in an activated state, the fish fixturing mechanism restrains the fish with a clamping force (e.g., directed substantially perpendicularly to the primary axis of the station, directed perpendicular the fish surface, etc.) and/or normal forces directed toward the fish (equivalently referred to herein as compression forces). Additionally or alternatively, the fixture can hold the fish in tension (e.g., by pulling on its tail and head), and/or otherwise restrain the fish. The clamping force can act on the fish vertically (e.g., using two opposing lateral forces, a lateral force biasing the fish against a wall), laterally (e.g., using a downward force biasing the fish against a bottom side of the station), and/or restrained in any other suitable position. Optionally, an additional element (e.g., a bumper) provides a restraining force perpendicular to the axis of the clamping force.

However fixturing the fish can be otherwise performed.

4.5 Performing a Set of Tooling Operations S400.

Figure 4B:
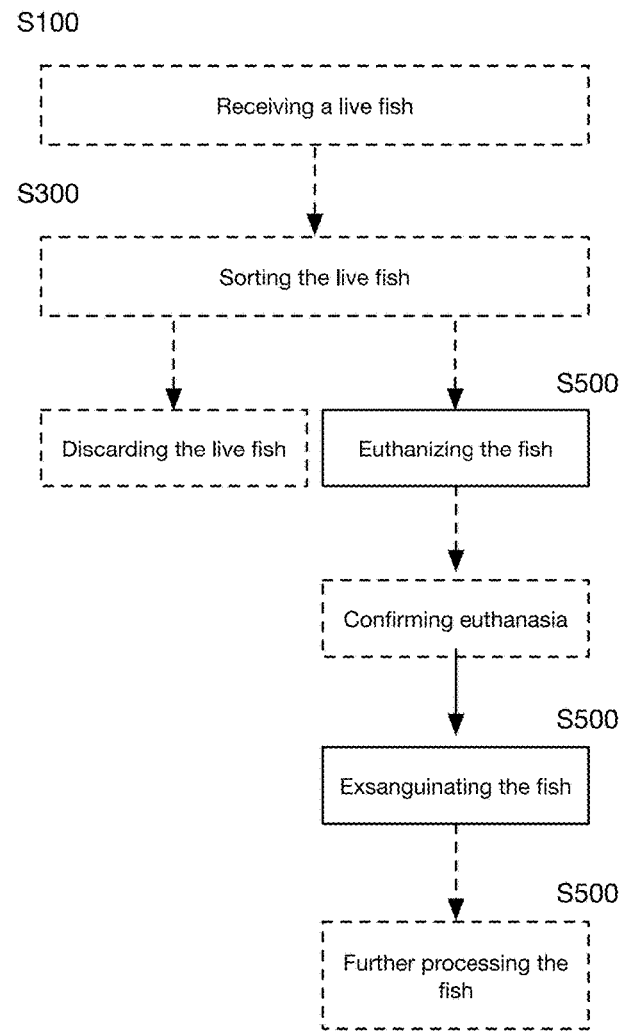

Performing a set of tooling operations S400 can function to euthanize, exsanguinate, post-process (e.g., fillet, descale, etc.), and/or otherwise process a fish. Preferably, as shown in FIG. 4B, the set of tooling operations include: euthanizing the fish, exsanguinating the fish, and optionally further processing the fish (e.g., filleting, packaging, descaling, etc.).

Preferably the method includes performing one or more tooling operations in one fish processing device, but additionally or alternatively can performing one or more tooling operations in separate fish processing device (e.g., wherein the fish can optionally be automatically transferred between fish processing devices by conveyor, chute, etc.; within the same location(s) such as within the same fixturing mechanism, etc.). In a preferred variant, at least euthanizing the fish and exsanguinating the fish are performed in the same device (e.g., without re-fixturing the fish between the two steps). Preferably the method includes performing multiple consecutive and/or simultaneous tooling operations without re-fixturing the fish between the operations, but can additionally or alternatively include re-fixturing the fish between two or more operations.

The inventors have discovered that it can be particularly advantageous to build a tooling system (e.g., particularly for euthanasia via drill) wherein the tools move along one or more degrees of freedom than necessary for actuation of the tool during actuation of the tool. In a first specific example, the drill can wiggle, vibrate, and/or otherwise translate in one or more directions orthogonal to the long axis of the drill while actuating by translating along the long axis of the drill during a drilling operation of the fish (e.g., while euthanizing the fish via inducing brain death). In a second specific example, the drill can angulate at an angle offset from the long axis of the drill while actuating by rotating about the long axis of the drill during a drilling operation of the fish. In a third specific example, the drill can both wiggle and angulate relative to the long axis of the drill during the drilling operation of the fish. In all three specific examples, the inventors have discovered that these additional movements increase the accuracy of the system (e.g., lower the required tolerance of the system) to effectively target and neutralize the fish brain. Performing these additional movements while the drill is rotating has the additional benefit of sweeping the brain up in the flutes of the drill, though the same technique could be performed using a non-rotating tool (e.g., a bat, a blade, etc.). Additionally or alternatively, the techniques of the first, second, and third specific examples can be used for targeting non-brain areas of the fish (e.g., the heart, the lungs, etc.) with a drill and/or any other tool (e.g., those described herein).

Preferably, euthanizing the fish functions to induce brain death in the fish; however, other means of euthanasia can additionally or alternatively be employed (e.g., lack of response to stimuli, cessation of gill movement, lack of heartbeat, cessation of movement, etc.). The method can optionally include confirming euthanasia (e.g., using the analysis subsystem) after performing an euthanasia tooling operation. Euthanasia is preferably administered with a cut (e.g., cutting with a drill, cutting with a spike, cutting with a water jet, etc.), but can additionally or alternatively be administered with a blow (e.g., a percussive blow, a pneumatic blow, etc.) to the head region (e.g., as shown in FIGS. 13B and 13C), beheading, partial beheading, electrical shocks, and/or any other suitable methods. Euthanizing the fish is preferably performed rapidly while fish is conscious (e.g., without previously stunning the fish), which can result in the most humane euthanasia process, but can alternatively include stunning the fish and subsequently euthanizing the fish.

In a preferred variant, the euthanasia method includes drilling the fish through its brain. However, additional or alternative euthanasia methods can include: hitting the fish near its brain cavity once or more times with a blunt instrument (e.g., rod, priest, etc.), applying a sharp force through the brain (e.g., a spike, spear, drill, etc.), electrocuting, beheading, and/or any other suitable method. In variants, euthanizing the fish can be performed using any of the tools described herein.

Exsanguinating the fish can function to remove blood from the body of the fish after euthanizing the fish (e.g., to lacerate the fish to induce bleeding, and optionally further assist bleeding). Preferably, the method includes exsanguinating the fish within a time window (e.g., several minutes, immediately after, etc.) following euthanasia in which the heart continues to beat. However, the method can additionally or alternatively include exsanguinating the fish concurrently with euthanizing the fish (e.g., to maximize throughput efficiency).

Figure 11B:
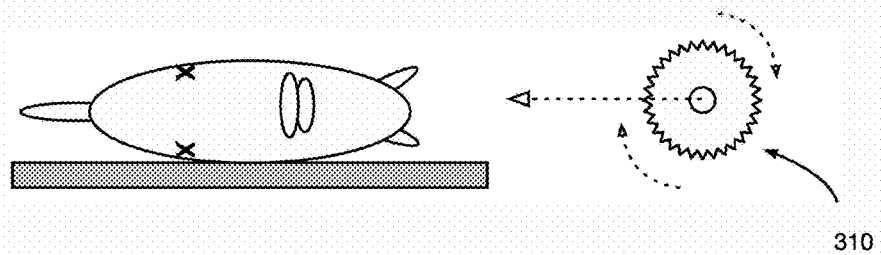

Optionally, exsanguinating the fish with a tool can include lacerating the fish at one or multiple locations of the fish (e.g., at the tail, the gills, and/or at any other point along a cutting line of action). Preferably for a tail cut, the cutting line of action is substantially perpendicular to the spine and angled up or sideways relative to the bottom of the fish (e.g., starts at the bottom of the fish and extends toward, but does not intersect, the spine; example shown in FIG. 11B; etc.). Alternatively, the tail cut can sever the spine. The tail cut preferably does not cut through the entirety of the fish thickness (e.g., leaves a flap of side musculature and/or skin), but can alternatively cut through the entirety of the fish thickness. In an illustrative example of the former variant, the tail cut mechanism can be set a predetermined distance away from the workstation bottom to ensure that the fish thickness is not completely cut through. Preferably for a gill cut, the cutting line of action points through the underbelly of the fish towards the spine, either at an angle to or perpendicular to the spine. The gill cut preferably extends through the entirety of the fish thickness, but can alternatively extend through a portion of the fish thickness. However, the line of action for cutting can be otherwise oriented. The cutting tool can move along one or more lines of action for positioning and cutting. Relative to the base of the exsanguination station, the cutting tool can cut from the top-down, from the base-up, from one side to another, and/or at any other angle or angles.

Optionally, the method can include one or more post-processing steps. In an example, a post-processing station (e.g., the same or different as a station that performs euthanasia and/or exsanguination) can be configured for spine removal. The spine removal tool can be: a wire (e.g., for spine extraction), hosing (e.g., for spine blasting), and/or any other suitable element. The station can optionally include a hoisting element (e.g., grippers, a lever, a wire, etc.) to lift a severed tail flap of the fish to expose the spine to the spine removal tool.

However, performing a set of tooling operations S400 can be otherwise performed.

Different processes and/or elements discussed above can be performed and controlled by the same or different entities. In the latter variants, different subsystems can communicate via: APIs (e.g., using API requests and responses, API keys, etc.), requests, and/or other communication channels. Communications between systems can be encrypted (e.g., using symmetric or asymmetric keys), signed, and/or otherwise authenticated or authorized.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUS, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A system for fish processing, comprising:
a fish fixturing subsystem comprising:
a clear restraining material configured to immobilize a live fish;
a set of fish processing tools;
a set of sensors configured to sample a set of measurements of the fish;
an analysis subsystem comprising a set of models configured to determine a set of control parameters for the set of fish processing tools based on the set of measurements.

2. The system of claim 1, wherein the set of fish processing tools comprises a drill.

3. The system of claim 2, wherein the set of control parameters comprises a point of entry and an angle of entry of the drill relative to a head of the fish and along a sagittal plane of the fish.

4. The system of claim 2, wherein the set of control parameters comprises an angle of rotation of the drill offset from a drill primary axis during a drilling operation of the drill.

5. The system of claim 1, wherein the clear restraining material is flexible and inelastic.

6. The system of claim 1, wherein the clear restraining material comprises transparent sheet vinyl.

7. The system of claim 1, wherein the fish fixturing subsystem further comprises a set of actuated rollers.

8. The system of claim 1, wherein the set of fish processing tools comprises an oscillating blade.

9. The system of claim 1, wherein the analysis subsystem further comprises a set of models configured to determine a set of control parameters for the fish fixturing subsystem based on the set of measurements.

10. The system of claim 1, wherein the set of control parameters comprise a degree of rotation of a set of rollers that roll up the clear restraining material.

11. The system of claim 1, wherein the set of sensors comprise a camera, wherein the camera is positioned with a view angle of the fish through the clear restraining material.

12. The system of claim 1, wherein the system is configured to consecutively euthanize multiple fish of varying species using a same fish processing tool of the set of fish processing tools.

13. A system for processing a fish, comprising:
a fish fixturing subsystem;
a tooling subsystem comprising a rotating fish processing tool; and
an analysis subsystem comprising:
a set of sensors configured to output a set of measurements of the fish; and a set of models configured to determine a set of control parameters for the tooling subsystem based on the set of measurements.

14. The system of claim 13, wherein the fish fixturing subsystem comprises a clear, flexible sheet of restraining material that, when actuated, contact a set of contours of a live fish exterior.

15. The system of claim 13, wherein the rotating fish processing tool comprises a drill.

16. The system of claim 13, wherein the tooling subsystem further comprises an oscillating blade.

17. The system of claim 13, wherein the tooling subsystem further comprises a parallel manipulator coupled to the rotating fish processing tool.

18. The system of claim 17, wherein:
the rotating fish processing tool comprises a drill;
the parallel manipulator comprises a set of links configured to enable translation of the drill in a direction not parallel to the drill line of actuation; and
the set of control parameters comprise a set of translations of the drill orthogonal to the drill line of actuation during a drilling operation of the drill.

19. The system of claim 13, wherein:
the rotating fish processing tool comprises a drill pointed in a first direction; and
the parallel manipulator comprises a set of links configured to enable a rotation of the drill at an angle offset from the first direction.

20. The system of claim 13, wherein the system further comprises a control system configured to initiate the rotation of the drill at the angle offset from the first direction during a drilling operation of the drill.

* * * * *